(12) United States Patent
Johnson et al.

(10) Patent No.: US 10,368,364 B2
(45) Date of Patent: Jul. 30, 2019

(54) SATELLITE NETWORK SERVICE SHARING

(71) Applicant: ViaSat Inc., Carlsbad, CA (US)

(72) Inventors: Corey Ryan Johnson, San Diego, CA (US); Brian T. Sleight, Carlsbad, CA (US); Thomas Duncan Lookabaugh, Coronado, CA (US); James Esserman, La Jolla, CA (US); William F. Sullivan, Carlsbad, CA (US); Meherwan Polad, San Diego, CA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 15/943,444

(22) Filed: Apr. 2, 2018

(65) Prior Publication Data

US 2018/0242345 A1 Aug. 23, 2018

Related U.S. Application Data

(63) Continuation of application No. 15/440,275, filed on Feb. 23, 2017, now Pat. No. 9,942,913, which is a continuation of application No. 15/238,410, filed on Aug. 16, 2016, now Pat. No. 9,622,259, which is a
(Continued)

(51) Int. Cl.
| | |
|---|---|
| *H04B 7/185* | (2006.01) |
| *H04W 72/12* | (2009.01) |
| *H04B 7/204* | (2006.01) |
| *H04L 12/801* | (2013.01) |
| *H04L 12/851* | (2013.01) |

(Continued)

(52) U.S. Cl.
CPC .... *H04W 72/1257* (2013.01); *H04B 7/18595* (2013.01); *H04B 7/2041* (2013.01); *H04L 47/14* (2013.01); *H04L 47/2483* (2013.01); *H04L 47/2491* (2013.01); *H04W 84/06* (2013.01)

(58) Field of Classification Search
CPC .............. H04W 72/1257; H04W 84/06; H04B 7/18595; H04B 7/2041; H04L 47/14; H04L 47/2491; H04L 47/2483
See application file for complete search history.

(56) References Cited

U.S. PATENT DOCUMENTS 6,021,309 A * 2/2000 Sherman ............ H04B 7/18534
455/12.1
6,377,561 B1 4/2002 Black et al.
(Continued)

*Primary Examiner* — Jay P Patel
(74) *Attorney, Agent, or Firm* — Holland & Hart LLP

(57) ABSTRACT

Methods, systems, and devices are described for providing network access services to mobile users via multi-user network access terminals over a multi-beam satellite system. Quality-of-service (QoS) is controlled for the mobile devices at a per-user level according to user-specific traffic policies Mobile users may be provisioned on the satellite system according to a set of traffic policies based on their service level agreement (SLA). System resources of the satellite may be allocated to mobile users based on the demand of each mobile user and the set of traffic polices associated with each mobile user, regardless of which multi-user network access terminal is used to access the system. Dynamic multiplexing of traffic from fixed terminals and mobile users on the same satellite beam can take advantage of statistical multiplexing of large numbers of users and on different usage patterns between fixed terminals and mobile users.

29 Claims, 18 Drawing Sheets

Related U.S. Application Data continuation of application No. 14/216,003, filed on Mar. 17, 2014, now Pat. No. 9,455,777.

(60) Provisional application No. 61/799,216, filed on Mar. 15, 2013.

(51) Int. Cl.
*H04L 12/857* (2013.01)
*H04W 84/06* (2009.01)

(56) References Cited

U.S. PATENT DOCUMENTS

| | | | |
|---|---|---|---|
| 6,463,279 B1 * | 10/2002 | Sherman | H04B 7/18539 455/12.1 |
| 6,738,363 B1 | 5/2004 | Best et al. | |
| 7,187,927 B1 * | 3/2007 | Mitchell | H04W 36/12 455/431 |
| 8,432,808 B1 | 4/2013 | Dankberg et al. | |
| 8,909,220 B1 * | 12/2014 | Aftahi | H04B 7/2041 370/316 |
| 9,276,665 B1 | 3/2016 | Johnson et al. | |
| 9,319,292 B2 | 4/2016 | Wyatt et al. | |
| 9,680,559 B1 * | 6/2017 | Freedman | H04B 7/1851 |
| 2003/0050008 A1 | 3/2003 | Patterson et al. | |
| 2005/0037706 A1 | 2/2005 | Settle | |
| 2006/0052139 A1 | 3/2006 | Teo et al. | |
| 2006/0178143 A1 | 8/2006 | Chang et al. | |
| 2006/0234716 A1 | 10/2006 | Vesterinen et al. | |
| 2006/0281476 A1 | 12/2006 | Lane et al. | |
| 2007/0087756 A1 | 4/2007 | Hoffberg | |
| 2010/0105409 A1 | 4/2010 | Agarwal et al. | |
| 2010/0120359 A1 | 5/2010 | Agarwal | |
| 2010/0179986 A1 | 7/2010 | Sebastian et al. | |
| 2010/0290352 A1 | 11/2010 | Oyman et al. | |
| 2012/0294384 A1 | 11/2012 | Wilcoxson et al. | |
| 2012/0324094 A1 | 12/2012 | Wyatt et al. | |
| 2013/0155961 A1 | 6/2013 | Brunnenmeyer | |
| 2015/0131703 A1 | 5/2015 | Balter et al. | |
| 2015/0146631 A1 | 5/2015 | Kim et al. | |
| 2016/0142327 A1 | 5/2016 | Johnson et al. | |

* cited by examiner

SATELLITE NETWORK SERVICE SHARING

CROSS REFERENCES

The present Application is a Continuation of U.S. patent application Ser. No. 15/440,275 by Johnson, et al., entitled, "Satellite Network Service Sharing," filed Feb. 23, 2017; which is a continuation of U.S. patent application Ser. No. 15/238,410 by Johnson, et al., entitled "Satellite Network Service Sharing," filed Aug. 16, 2016; which is a continuation of U.S. patent application Ser. No. 14/216,003, by Johnson, et al., entitled "Satellite Network Service Sharing," filed Mar. 17, 2014; which claims priority to U.S. Provisional Patent Application No. 61/799,216 by Johnson et al., entitled "Satellite Network Service Sharing," filed Mar. 15, 2013; each of which is assigned to the assignee hereof, and expressly incorporated by reference herein.

BACKGROUND

The present disclosure relates to wireless communications in general, and in particular, to broadband satellite communications networks.

As demand for broadband communications continues to grow around the world, broadband satellite communication networks have been deployed and continue to be developed to address that demand.

SUMMARY

Methods, systems, and devices are described for providing high-quality and consistent network access service to mobile users who receive network access service via mobile terminals that provide service concurrently to multiple mobile users. In embodiments, the satellite system 100 is configured to dynamically multiplex traffic from fixed terminals and mobile users on the same satellite beams. As demand from fixed terminals and mobile users varies over time, system resources may be allocated for each time period (e.g., frame, epoch, etc.) according to the demand and traffic policies for each fixed terminal and mobile user. Because usage patterns vary between fixed terminals and mobile users, multiplexing of a commonly provisioned resource pool for fixed terminals and mobile users may increase the efficiency of statistical multiplexing for the system resources (e.g., frequency, time, etc.) of the satellite system.

In embodiments, the system is configured to control QoS for network access service for mobile devices accessing the system through the mobile terminals at a per-user level. The mobile users 180 may have an existing SLA with the satellite networking provider or may sign up for service according to an SLA upon connecting to one of the mobile terminals 170. The mobile users 180 may be provisioned on the satellite system 100 according to a set of traffic policies based on their SLA. System resources of the satellite may be allocated to mobile users based on the demand of each mobile user and the set of traffic polices associated with each mobile user, regardless of which mobile terminal is used to access the system. Allocation of system resources to mobile users based on demand and/or user-specific traffic policies may be performed (for FL and/or RL) by scheduling of system resources and/or traffic shaping of data traffic streams. For example, traffic flow may be controlled individually for each mobile user using forward link traffic shaping at the satellite gateway and/or return link traffic shaping at the mobile terminal. In embodiments, per-user QoS is combined with dynamic multiplexing of traffic from fixed terminals and mobile users on the same satellite beams to provide enhanced QoS for mobile users with flexible bandwidth allocation and improved statistical multiplexing.

Some embodiments are directed to a method for providing network access services in a multi-beam satellite system including providing a communication service via satellite beams of the multi-beam satellite system, receiving, from one or more multi-user network access terminals serviced via a first satellite beam of a multi-beam satellite, first resource requests for a first time period for first mobile data traffic associated with a plurality of mobile devices in communication with the one or more multi-user network access terminals, wherein the plurality of mobile devices are associated with user-specific traffic policies, and scheduling transmission of the first mobile data traffic on first beam resources of the first satellite beam according to the first resource demands and the user-specific traffic policies.

In some embodiments, the method includes receiving, from at least one multi-user network access terminal of the one or more multi-user network access terminals, second resource demands for a second time period for second mobile data traffic associated with a subset of the plurality of mobile devices in communication with the at least one multi-user network access terminal, wherein the at least one multi-user network access terminal is serviced via a second satellite beam of the multi-beam satellite system for the second time period and scheduling transmission of the second mobile data traffic on second beam resources of the second satellite beam according to the second resource demands and the user-specific traffic policies. The second satellite beam may be a second beam of the multi-beam satellite or a beam of a second multi-beam satellite.

In some embodiments, the method includes identifying, for each of the plurality of mobile devices, traffic streams of the first mobile data traffic associated with each mobile device. Scheduling transmission of the first mobile data traffic may include allocating the first beam resources to the one or more multi-user network access terminals based on the first resource demands and the user-specific traffic policies associated with each of the plurality of mobile devices and determining portions of the traffic streams to be transmitted on the first beam resources for the first time period based on the first resource demands and the user-specific traffic policies associated with each of the plurality of mobile devices. Allocating the first beam resources to the one or more multi-user network access terminals may be further based on fixed resource demand for the first time period for fixed data traffic associated with a plurality of fixed terminals serviced via the first satellite beam. Identifying the traffic streams of the first mobile data traffic associated with each of the plurality of mobile devices may be based on at least one of public Internet Protocol (IP) addresses, virtual local area network (VLAN) tags, socket port numbers, or tunneling protocol identifiers, or a combination thereof.

In some examples, the traffic streams are forward link traffic streams. The method may include transmitting the portions of the forward link traffic streams to the one or more multi-user network access terminals on the first beam resources in the first time period. The method may include performing, at a network resource scheduler, forward link traffic shaping for the forward link traffic streams associated with the plurality of mobile devices based on the user-specific traffic policies assigned to the plurality of mobile devices.

In other examples, the traffic streams may be return link traffic streams. The method may include transmitting, from the one or more multi-user network access terminals, the portions of the return link traffic streams on the first beam resources in the first time period. The method may include performing, at the one or more multi-user network access terminals, return link traffic shaping for the return link traffic streams associated with the plurality of mobile devices based on the user-specific traffic policies assigned to the plurality of mobile devices.

In some embodiments, the user-specific traffic policies include a first provisioned service level for a first mobile device of the plurality of mobile devices and a second provisioned service level different from the first provisioned service level for a second mobile device of the plurality of mobile devices and the scheduling of the first mobile data traffic includes allocating a first portion of the first beam resources to the first mobile device and a second portion of the first beam resources to the second mobile device, the first and second portions allocated based on the first and second provisioned service levels, respectively.

In some embodiments, the user-specific traffic policies associated with each of the plurality of mobile devices include at least one of a minimum information rate (MinIR), a peak information rate (PIR), a committed information rate (mobile data traffic first provisioned service level first mobile device CIR), a time-based usage level, or a combination thereof.

In some embodiments, an identified resource demand for a first mobile device of the plurality of mobile devices is greater than a committed information rate (CIR) of the user-specific traffic policy associated with the first mobile device. Scheduling transmission of the first mobile data traffic may include determining, for the first time period, an uncongested resource condition for the first satellite beam, allocating, to the first mobile device for the first time period, resources greater than the CIR of the user-specific traffic policy associated with the first mobile device, determining, for a second time period, a congested resource condition for the first satellite beam, and allocating, to the first mobile device for the second time period, resources corresponding to the CIR of the user-specific traffic policy associated with the first mobile device.

Some embodiments are directed to a satellite communication system for providing network access services, including a multi-beam satellite providing a communication service via satellite beams and a network resource scheduler in communication with the multi-beam satellite, the network resource scheduler including a network request module configured to receive, from one or more multi-user network access terminals serviced via a first satellite beam of a multi-beam satellite, first resource requests for a first time period for first mobile data traffic associated with a plurality of mobile devices in communication with the one or more multi-user network access terminals, wherein the plurality of mobile devices are associated with user-specific traffic policies, and a satellite resource allocation module configured to schedule transmission of the first mobile data traffic on first beam resources of the first satellite beam according to the first resource demands and the user-specific traffic policies.

In some embodiments, the network request module is configured to receive, from at least one multi-user network access terminal of the one or more multi-user network access terminals, second resource demands for a second time period for second mobile data traffic associated with a subset of the plurality of mobile devices in communication with the at least one multi-user network access terminal, wherein the at least one multi-user network access terminal is serviced via a second satellite beam of the multi-beam satellite system for the second time period, and the satellite resource allocation module is configured to schedule transmission of the second mobile data traffic on second beam resources of the second satellite beam according to the second resource demands and the user-specific traffic policies.

In some embodiments, the network resource scheduler includes a network request module configured to identify, for each of the plurality of mobile devices, traffic streams of the first mobile data traffic associated with each mobile device. The satellite resource allocation module may be configured to allocate the first beam resources to the one or more multi-user network access terminals based on the first resource demands and the user-specific traffic policies associated with each of the plurality of mobile devices, and determine portions of the traffic streams to be transmitted on the first beam resources for the first time period based on the first resource demands and the user-specific traffic policies associated with each of the plurality of mobile devices. Allocating the first beam resources to the one or more multi-user network access terminals may be further based on fixed resource demand for the first time period for fixed data traffic associated with a plurality of fixed terminals serviced via the first satellite beam.

In some examples, the traffic streams are forward link traffic streams. The network resource scheduler may include a forward link traffic shaping module configured to perform forward link traffic shaping for the forward link traffic streams associated with the plurality of mobile devices based on the user-specific traffic policies assigned to the plurality of mobile devices.

In some examples, the traffic streams are return link traffic streams. The network resource scheduler may include a return link traffic shaper configured to perform return link traffic shaping for the return link traffic streams associated with the plurality of mobile devices based on the user-specific traffic policies assigned to the plurality of mobile devices.

In some embodiments, identified resource demand for a first mobile device of the plurality of mobile devices is greater than a committed information rate (CIR) of the user-specific traffic policy associated with the first mobile device. The satellite resource allocation module may be configured to determine, for the first time period, an uncongested resource condition for the first satellite beam, allocate, to the first mobile device for the first time period, resources greater than the CIR of the user-specific traffic policy associated with the first mobile device, determine, for a second time period, a congested resource condition for the first satellite beam, and allocate, to the first mobile device for the second time period, resources corresponding to the CIR of the user-specific traffic policy associated with the first mobile device.

Some embodiments are directed to an apparatus for providing network access services in a multi-beam satellite communication system providing a communication service via satellite beams, including means for receiving, from one or more multi-user network access terminals serviced via a first satellite beam of a multi-beam satellite, first resource requests for a first time period for first mobile data traffic associated with a plurality of mobile devices in communication with the one or more multi-user network access terminals, wherein the plurality of mobile devices are associated with user-specific traffic policies, and means for scheduling transmission of the first mobile data traffic on first beam resources of the first satellite beam according to the first resource demands and the user-specific traffic policies.

In some embodiments, the means for receiving receives, from at least one multi-user network access terminal of the one or more multi-user network access terminals, second resource demands for a second time period for second mobile data traffic associated with a subset of the plurality of mobile devices in communication with the at least one multi-user network access terminal, wherein the at least one multi-user network access terminal is serviced via a second satellite beam of the multi-beam satellite system for the second time period and the means for scheduling schedules transmission of the second mobile data traffic on second beam resources of the second satellite beam according to the second resource demands and the user-specific traffic policies.

In some embodiments, the apparatus includes means for identifying, for each of the plurality of mobile devices, traffic streams of the first mobile data traffic associated with each mobile device. The means for scheduling may allocate the first beam resources to the one or more multi-user network access terminals based on the first resource demands and the user-specific traffic policies associated with each of the plurality of mobile devices and determine portions of the traffic streams to be transmitted on the first beam resources for the first time period based on the first resource demands and the user-specific traffic policies associated with each of the plurality of mobile devices. The means for scheduling may allocate the first beam resources to the one or more multi-user network access terminals further based on fixed resource demand for the first time period for fixed data traffic associated with a plurality of fixed terminals serviced via the first satellite beam.

In some examples, the traffic streams are forward link traffic streams. The apparatus may include means for performing forward link traffic shaping for the forward link traffic streams associated with the plurality of mobile devices based on the user-specific traffic policies assigned to the plurality of mobile devices.

In some examples, the traffic streams are return link traffic streams. The apparatus may include means for performing return link traffic shaping for the return link traffic streams associated with the plurality of mobile devices based on the user-specific traffic policies assigned to the plurality of mobile devices.

In some embodiments, an identified resource demand for a first mobile device of the plurality of mobile devices is greater than a committed information rate (CIR) of the user-specific traffic policy associated with the first mobile device. The means for scheduling may determine, for the first time period, an uncongested resource condition for the first satellite beam, allocate, to the first mobile device for the first time period, resources greater than the CIR of the user-specific traffic policy associated with the first mobile device, determine, for a second time period, a congested resource condition for the first satellite beam, and allocate, to the first mobile device for the second time period, resources corresponding to the CIR of the user-specific traffic policy associated with the first mobile device.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
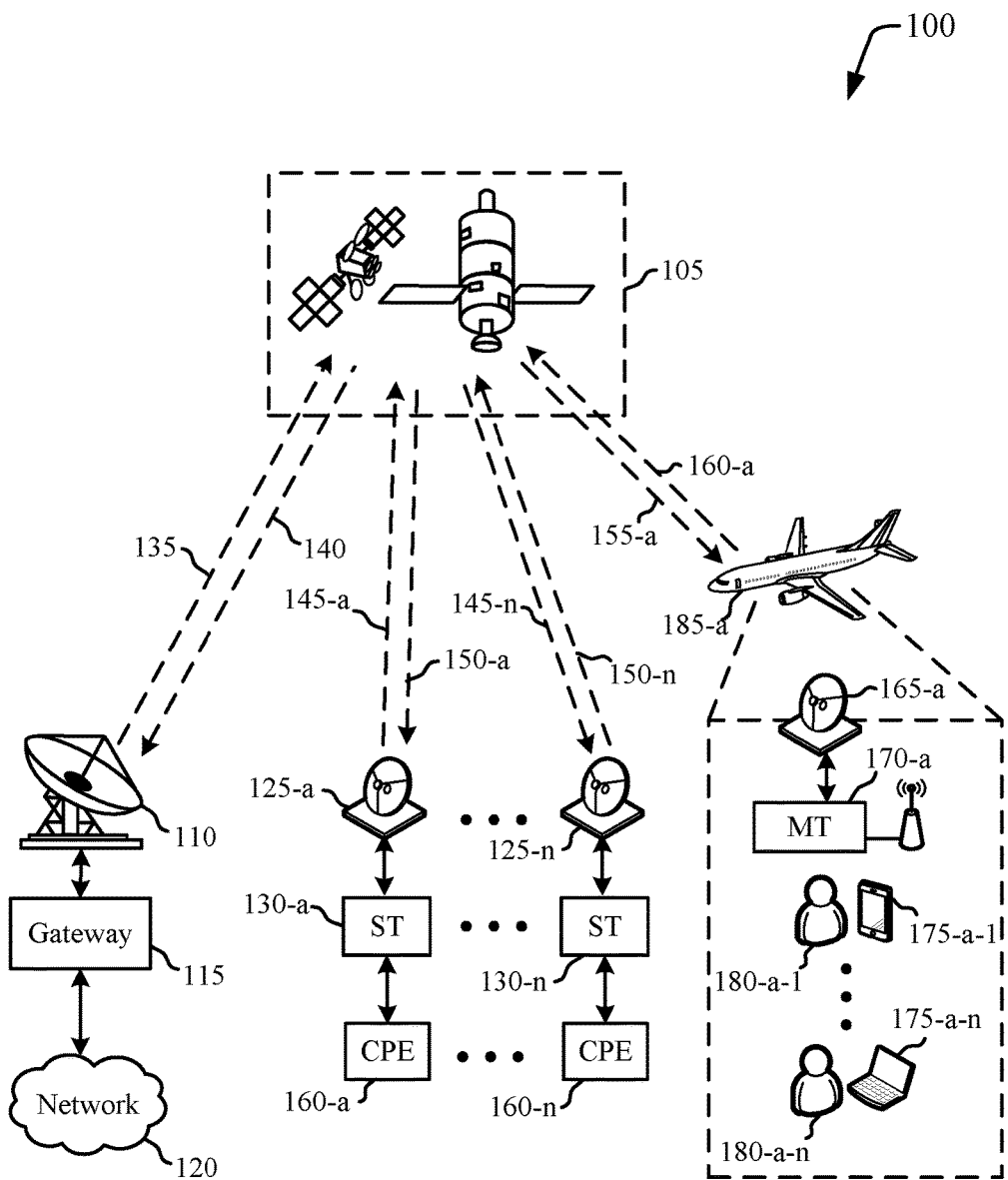
FIG. 1 is a simplified diagram of an example satellite communications system 100 in which the principles included herein may be described

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Communication satellites have evolved from one-way broadcast services such as broadcast television service to bi-directional network access services such as Internet access, telephony, streaming media, private networking, and/or other networking services. Generally, satellite network access services are provided via satellite terminals that can transmit and receive to a satellite via beams of the satellite. Each terminal within the coverage area of a satellite beam shares system resources (e.g., system bandwidth, time, etc.) with the other terminals located within the beam. Service may be provided for subscribers by allocating system resources of the service beam to each terminal according to a service level agreement (SLA) between the satellite networking provider and the subscriber associated with the terminal. The SLA may specify Quality of Service (QoS) to be provided at the terminal according to a set of traffic policies (e.g., rate-based, usage-based, time-based, etc.). For example, QoS for terminals may be specified by a minimum information rate (MinIR), committed information rate (CIR), peak information rate (PIR), a maximum amount of data (e.g., 2 GB/month), and/or the like.

Communication satellites may be single-beam satellites covering a geographical area with a single beam or multi-beam satellites covering geographical areas with a number of spot beams. A spot beam is a satellite signal focused on a limited geographic area of the Earth. By reducing the coverage area of the beam, a more directional antenna may be used by the satellite to transmit data to and receive data from a region of the Earth. Because the gain of an antenna is typically proportional to its directionality, a spot beam may be transmitted at a higher gain than a satellite signal with a wider coverage area at the same amount of power. This higher gain can produce better signal-to-noise (SNR) ratio at the terminal, which allows for higher rates of data transfer between the satellite and terminals. As another example, less transmitter power is required for terminals to transmit to spot-beam satellites, allowing for smaller and less expensive terminals. Additionally, spot-beam satellites include the ability to reuse the same frequency bands and channels throughout the spot-beam pattern and associated coverage area.

FIG. 1 is a simplified diagram of an example satellite communications system 100 in which the principles included herein may be described. The satellite communications system 100 may be any suitable type of satellite system, including a geostationary satellite system, medium earth orbit (MEO), or low earth orbit (LEO) satellite system. In embodiments, satellite communications system 100 includes one or more geostationary multi-beam satellites 105 configured to communicate with subscriber terminals 130 located within a defined geographical service area. Each subscriber terminal 130 is located within at least one service beam 135 and is capable of two-way communication with the satellite 105 via an antenna 125. Each subscriber terminal 130 may be connected with (e.g., may provide network access service for) one or more customer devices 160 (e.g., desktop computers, laptops, set-top boxes, smartphones, tablets, Internet-enabled televisions, and the like). These customer devices 160 may also be known as customer premises equipment (CPE).

The network 120 may be any suitable type of network and may connect the gateway system 115 with other gateway systems, which may also be in communication with the satellite(s) 105. Alternatively, a separate network linking gateways and other nodes may be employed to cooperatively service user traffic. The gateway system 115 may be located within the service area, or may be located outside of the service area in various embodiments. The network 120 may include networks of the satellite communication service provider and third-party networks such as content delivery networks (CDNs), private networks, the Internet, and the like.

The operation of satellite communications system 100 can be separated into a forward (downstream) direction and a return (upstream) direction. In the forward direction or forward link (FL), data arrives at gateway 115 from network 120, gateway 115 transmits that data up to satellite 105 over forward feeder links 135, and satellite 105 relays that data down in forward service links 145 to subscriber terminals 130. In the return direction or return link (RL), subscriber terminals 130 transmit return service links 150 up to satellite 105, satellite 105 relays that data down to gateway 115 in return feeder links 140, and gateway 115 forwards that data to network 120.

The gateway system 115 may be configured to format the data and information along with control signals for delivery via the satellite 105 to the respective subscriber terminals 130. The gateway system 115 may format the data and information using a modulation and coding scheme (MCS) that may be custom to the satellite or similar to others in the industry. Satellites may also employ Adaptive Coding and Modulation (ACM) or Variable Coding and Modulation (VCM) to vary the MCS depending on channel conditions and/or other factors. Similarly, the gateway system 115 may also be configured to receive signals from the satellite 105 (e.g., from one or more subscriber terminals 130) that are directed to a destination in the network 120.

The gateway system 115 may use an antenna 110 to transmit signals to and receive signals from the satellite 105. In one embodiment, a geostationary satellite 105 is configured to receive signals from the antenna and within the frequency band and specific polarization transmitted. In one embodiment, the satellite 105 operates in a multi-beam mode, transmitting a number (e.g., typically 20-150, etc.) of spot beams each directed at a different region of the earth. This can allow coverage of a relatively large geographical area and frequency re-use within the covered area. Spot beams for communication with subscriber terminals 130 may be called service beams while spot beams for communication with gateways may be called feeder beams. In embodiments, the service beams are fixed location spot beams, meaning that the angular beam width and coverage area for each service beam does not intentionally vary with time.

With such a multi-beam satellite, there may be a number of different signal switching configurations, allowing signals from a single gateway system 115 to be switched between different spot beams. The signals transmitted from the satellite 105 may be received by one or more subscriber terminals 130 via a respective subscriber antenna 125. Similarly, signals transmitted from the subscriber terminals 130 via the respective subscriber antennas 125 may be received at the satellite 105 and directed to the gateway system 115 from the satellite 105.

Each service beam of the satellite 105 supports the terminals 130 within its coverage area (e.g., providing uplink and downlink resources). Frequency re-use between spot beams may be provided by assigning one, or more, ranges of frequencies (which may be referred to as channels) to each spot beam and/or by use of orthogonal polarizations. A particular frequency range and/or polarization may be called a "color," and frequency re-use in a tiled spot beam satellite system may be according to color. The coverage of different beams may be non-overlapping or have varying measures of overlap. In one embodiment, spot beams of the satellite 105 may be tiled and partially overlapping to provide complete or almost complete coverage for a relatively large geographical area (e.g., the Contiguous United States (CONUS), etc.) where partially overlapping or adjacent beams use different ranges of frequencies and/or polarizations. Each beam may contain a gateway, user terminals, or a gateway and user terminals. Gateway beams and service beams may also be separated from each other to allow frequency reuse between gateway and user beams. In some embodiments, satellite(s) 105 includes multiple satellites, each satellite providing coverage for a service area, where service areas for different satellites are non-overlapping or overlapping. One or more satellites may have more narrowly focused service beams providing higher data rates to regions with more elevated demand.

Increasingly, users desire to have network access service through mobile devices (e.g., smartphones, laptops, tablets, netbooks, and the like) while travelling. For example, there is a growing demand for network access service during air travel. Satellite communications systems originally designed for providing network access service to fixed-location terminals (e.g., subscriber terminals 130) can also provide network access service on airplanes (or other modes of transportation) through mobile terminals installed on the airplanes. Users can connect their mobile devices to the mobile terminal via wired or wireless (e.g., Wi-Fi, etc.) connections and network access is provided via the service beams of the satellite(s). While existing satellite systems can provide network access service to mobile users, providing a quality network access experience to mobile users that connect via mobile terminals that each provide network access service to a number of mobile users concurrently provides several challenges.

Typically, a mobile network access service provider that provides service via mobile terminals purchases a fixed portion of system resources (e.g., specific carriers of a frequency spectrum, a fixed amount of bandwidth, and the like) from a satellite operator to support the provided network access service. This fixed portion of system resources is then divided up by the mobile network access service provider to support each mobile terminal (e.g., equally, according to aggregate demand of users supported by the terminal, etc.). In this type of service structure, if the mobile network access service provider buys enough system resources to provide adequate service for all users connected during peak use of the mobile service, these system resources may be under-utilized during less congested times. If, however, the mobile network access service provider buys fewer system resources to reduce the under-utilization of purchased resources during un-congested times, users will experience poor quality service during times of more congested use. Thus, the mobile network access service provider attempts to anticipate demand, which may lead to under-utilization of purchased resources if the provider over-anticipates demand or a poor quality user experience where the provider under-anticipates demand.

Further, some users may take up a disproportionate share of the system resources of the mobile service, degrading the experience for other users. While it may be possible to restrict some types of traffic (e.g., high definition video, etc.), managing traffic flow for service provided through satellite terminals presents several challenges. For example, when network access is provided to multiple devices through an access point (e.g., Wi-Fi router, etc.), the access point is assigned (statically or dynamically) a public address (e.g., public IPv4 or IPv6 address) by a service provider. Typically, the access point maintains a private network for the connected devices with a private address space and performs network address translation (NAT) to control traffic flow between the devices and external networks (e.g., the Internet). Thus, traffic streams to or from multiple devices behind the access point will appear to nodes on an external network (e.g., the Internet) as associated with the same point (e.g., the public IP address of the access point). In a communication network where bandwidth is limited between external networks and the access point, managing downstream traffic individually for each device behind the access point may therefore be challenging, because the external network may not be able to identify packets destined for individual devices. While the access point can identify downstream traffic for individual devices to distribute the traffic correctly, once the traffic reaches the access point, it has already caused congestion of the bandwidth limited network link.

These and other issues of providing satellite network access service via mobile terminals typically result in inconsistent user experiences ranging from good connectivity at times to poor or even unusable connectivity at other times, often within the same session (e.g., the same flight, etc.).

As illustrated in FIG. 1, the satellite communication system 100 may also provide network access service to mobile users 180-a-1 to 180-a-n via mobile terminals 170. Each mobile user 180-a-1 to 180-a-n (via a mobile device 175, etc.), may be provided service on the satellite communication system 100 by connecting (e.g., via a wired or wireless connection) to a mobile terminal 170. As illustrated in FIG. 1, mobile devices 175-a-1 to 175-a-n are connected via wired or wireless connections (e.g., Wi-Fi, Ethernet, etc.) to an airplane-mounted mobile terminal 170-a. Mobile terminal 170-a receives data from satellite(s) 105 via forward link 155-a and transmits data to satellite(s) 105 via return link 160-a. As mobile terminal 170-a moves within the service area of satellite(s) 105, it may be serviced by one or more service beams of the satellite(s) 105 that also service fixed terminals 130. For example, a single flight may pass through the service beam regions for several different service beams and service for mobile terminal 170-a may be handed off between beams as mobile terminal 170-a progresses through the flight path. Each of the different service beams may service different groups of fixed terminals 130. While satellite communication system 100 is illustrated providing mobile network access service to mobile users 180 aboard airplane 185-a, it can be appreciated that the principles described herein for providing network access service to mobile users may be provided using multi-user or multi-subscriber network access terminals positioned in fixed locations or on various modes of transportation where multiple mobile users may desire network access via satellite communications system 100 (e.g., trains, boats, busses, etc.).

In embodiments, the satellite system 100 is configured to provide high-quality and consistent network access service to mobile users who receive network access service via mobile terminals that provide service concurrently to multiple mobile users. In embodiments, the satellite system 100 is configured to dynamically multiplex traffic from fixed terminals and mobile users on the same satellite beams. As demand from fixed terminals and mobile users varies over time, system resources may be allocated for each time period (e.g., frame, epoch, etc.) according to demand and traffic policies for each fixed terminal and mobile user. Because usage patterns vary between fixed terminals and mobile users, multiplexing fixed terminals and mobile users over a commonly provisioned resource pool may increase the resources (e.g., frequency, time, etc.) available to each fixed terminal and/or mobile user on a statistical basis.

In embodiments, the system is configured to control QoS for network access service for mobile devices accessing the system through the mobile terminals at a per-user level. The mobile users 180 may have an existing SLA with the satellite networking provider or may sign up for service according to an SLA upon connecting to one of the mobile terminals 170. The mobile users 180 may be provisioned on the satellite system 100 according to a set of traffic policies based on their SLA. System resources of the satellite may be allocated to mobile users based on the demand of each mobile user and the set of traffic polices associated with each mobile user, regardless of which mobile terminal is used by the mobile users to access the system. Allocation of system resources to mobile users based on demand and/or user-specific traffic policies may be performed (for FL and/or RL) by scheduling of system resources and/or traffic shaping of data traffic streams. For example, traffic flow may be controlled individually for each mobile user using forward link traffic shaping at the satellite gateway 115 or network 120 and/or return link traffic shaping at the mobile terminal. In embodiments, per-user traffic policies are combined with dynamic multiplexing of traffic from fixed terminals and mobile users on the same satellite beams to provide enhanced QoS for mobile users with flexible bandwidth allocation and improved efficiency of statistical multiplexing.

Returning to FIG. 1, fixed satellite terminals 130-*a* to 130-*n* and mobile terminal 170-1 may be serviced by the same satellite beam of a multi-beam satellite 105. The satellite system 100 may be configured to dynamically allocate portions (up to all) of system resources of the satellite beam to fixed satellite terminals 130-*a* to 130-*n* and mobile terminal 170-1 from a commonly scheduled resource pool depending on the demands of each fixed satellite terminal 130 and mobile user 180 and/or traffic policies associated with each fixed satellite terminal 130 and/or mobile user 180.

Figure 2A:
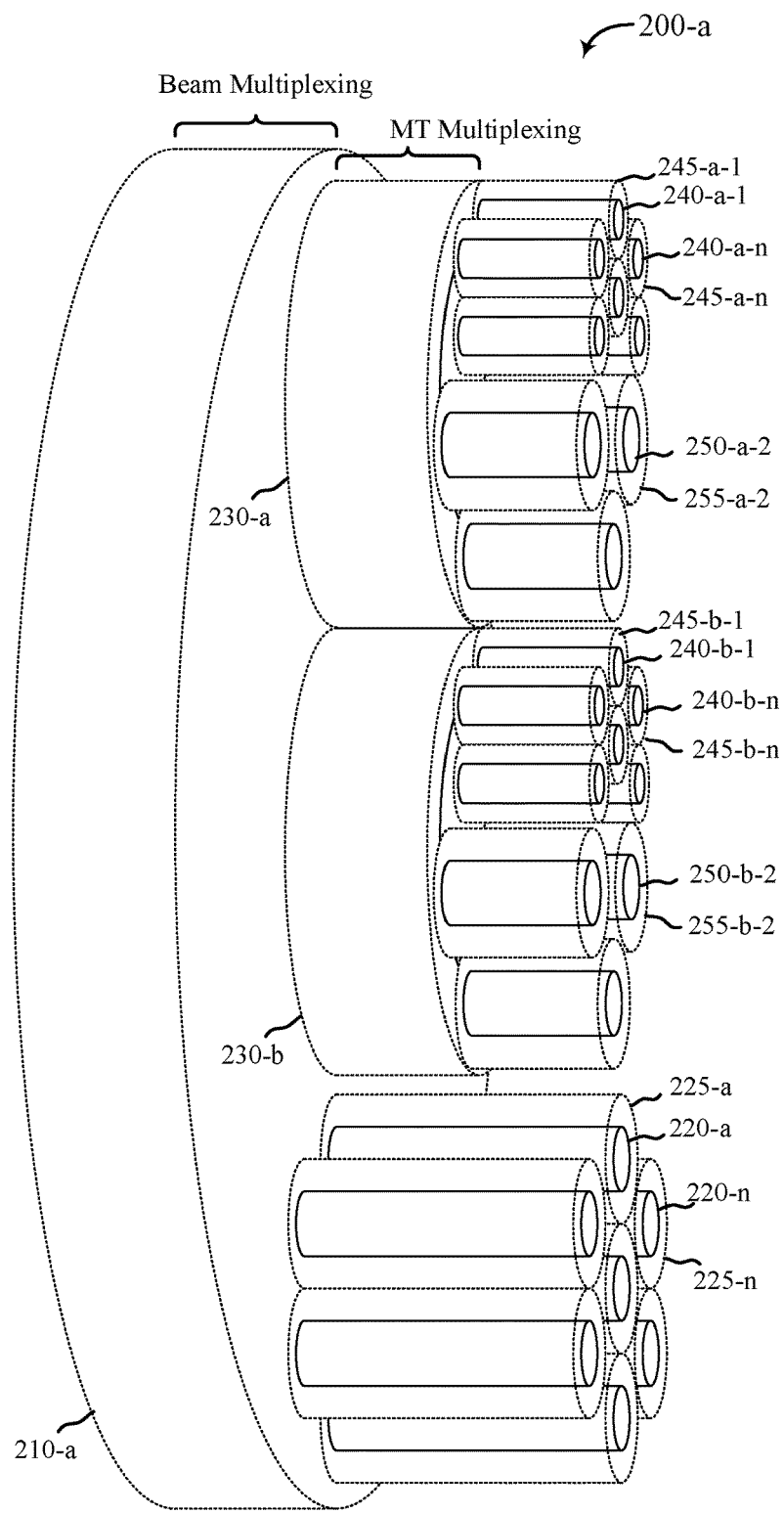
FIGS. 2A and 2B are diagrams illustrating a commonly provisioned resource pool for fixed terminals and mobile terminals serving mobile users in accordance with various embodiments.

FIG. 2A is a diagram 200-*a* illustrating a commonly provisioned resource pool for fixed terminals and mobile terminals serving mobile users in accordance with various embodiments. FIG. 2A may illustrate, for example, provisioned resources for a satellite beam of satellite system 100 in un-congested conditions. For clarity, the satellite beam is illustrated as providing service for a small number of mobile terminals and fixed terminals. However, it should be understood that each beam may serve thousands or more of fixed terminals and dozens or hundreds of mobile terminals, where each mobile terminal may provide network access service for dozens or hundreds of connected mobile users. In addition, it should be understood that mobile users may be connected to mobile terminals 170 on a transient basis and may receive service from different mobile terminals 170 under the same SLA. Mobile users may establish an account for service according to an SLA and then connect to multiple mobile terminals 170 using their account information as they travel. For example, the mobile user may connect to a first mobile terminal 170 on an airplane flight, connect to a second multi-user network access terminal 170 at a fixed location (e.g., coffee shop, etc.), and connect to a third mobile terminal 170 on a return flight. It should also be appreciated that the number of mobile users connected to each mobile terminal 170 may vary over time (e.g., based on take-rate of the service on particular flights, airplane capacity, etc.).

In FIG. 2A, fixed terminals (e.g., subscriber terminals 130, etc.) may be provisioned (e.g., for FL and/or RL) for service according to terminal-specific traffic policies including CIR 220 and/or PIR 225. The terminal-specific traffic policies may be based on SLAs between the fixed terminal subscribers and the satellite network service provider. For example, fixed terminal 130-*a* may be provisioned for CIR 220-*a* and PIR 225-*a* while fixed terminal 130-*n* may be provisioned for CIR 220-*n* and PIR 225-*n*. Other fixed terminals 130 may be provisioned for service in a similar manner and different fixed terminals may be provisioned for different service levels (not shown).

In FIG. 2A, mobile users may be provisioned (e.g., for FL and/or RL) for service according to user-specific traffic policies that may be rate-based, usage-based, and/or time-based. For example, user 180-*a*-1 may be provisioned for CIR 240-*a*-1 and PIR 245-*a*-1 and user 180-*a*-*n* may be provisioned for CIR 240-*a*-*n* and PIR 245-*a*-*n*. Other users connected to the mobile terminal 170-*a* may be provisioned for service in a similar manner and different levels of service may be offered. For example, a third user 180 may be provisioned for CIR 250-*a*-2 and PIR 255-*a*-2. Users 180 connected to other mobile terminals 170 may be provisioned in a similar manner. For example, user B1, user B2, and user BN connected to a second mobile terminal 170 may be provisioned for CIR 240-*b*-1 and PIR 245-*b*-1, CIR 250-*b*-2 and PIR 255-*b*-2, and CIR 240-*b*-*n* and PIR 245-*b*-2, respectively. Provisioned resources 230 may represent the aggregate provisioned resources for users connected to a satellite network access terminal that provides service to multiple users 180 according to user-specific traffic policies (e.g., mobile terminals 170). For example, provisioned resources 230-*a* may represent provisioned resources for users connected to one multi-user satellite network access terminal and provisioned resources 230-*b* may represent provisioned resources for users connected to a different multi-user satellite network access terminal.

In FIG. 2A, multiplexed satellite beam resources 210-*a* may represent aggregate multiplexed provisioned resources for the satellite beam. For example, multiplexed satellite beam resources 210-*a* may represent an aggregate forward link PIR for all fixed satellite terminals and mobile users serviced by the beam and may be greater than the physical resources of the satellite beam.

Where the satellite beam is uncongested, as is illustrated in FIG. 2A, some fixed satellite terminals 130 and/or mobile users 180 can be allocated resources based on their resource demand (e.g., up to their assigned PIR) while other terminals 130 and/or mobile users 180 are using fewer resources. Typically, the instantaneous demand for fixed satellite terminals and mobile users serviced by a beam will be substantially lower than the theoretical demand based on the peak usage rates for each fixed terminal and mobile user. Thus, the statistically multiplexed satellite beam resources 210-*a* may be substantially greater than instantaneous demand based on the provisioned resources to each fixed terminal 130 and mobile user 180.

Figure 2B:
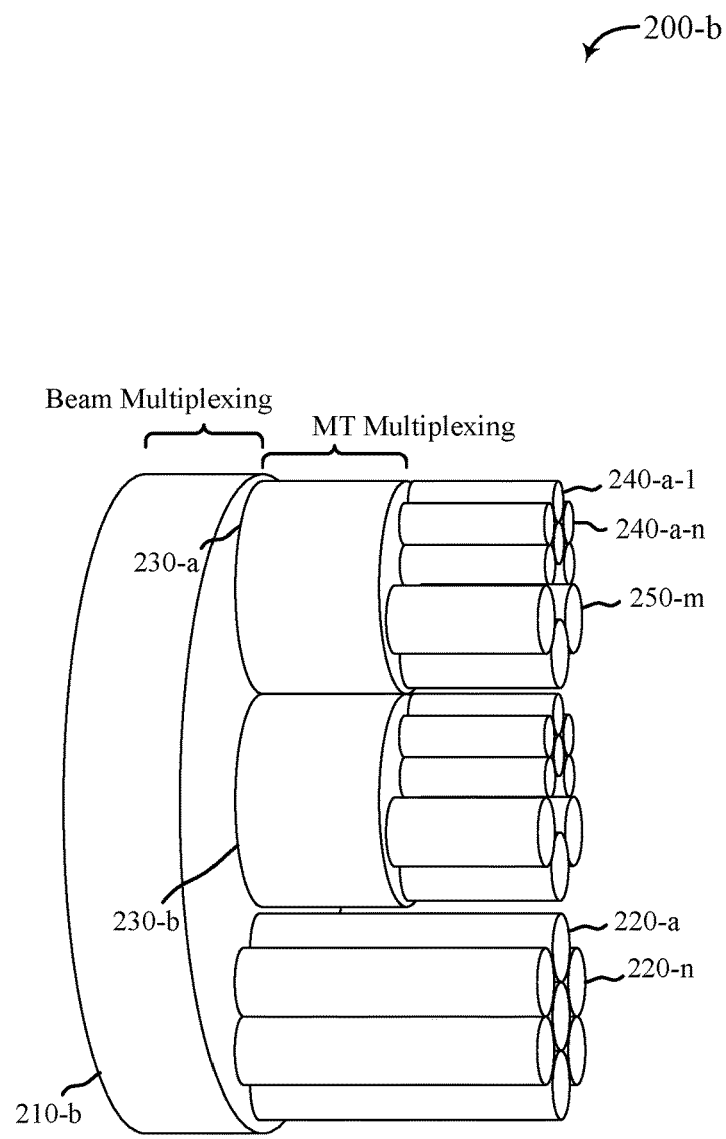

FIG. 2B is a diagram 200-*b* illustrating a commonly provisioned resource pool for fixed terminals and mobile terminals serving mobile users in accordance with various embodiments. FIG. 2B may illustrate, for example, the effects of network congestion on the provisioned resources illustrated in FIG. 2A.

FIG. 2B may illustrate how congestion of the satellite beam affects scheduling of resources in the satellite system. As illustrated in FIG. 2B, when the resource demand for a substantial number of users (e.g., fixed terminals 130 and mobile users 180) increases to the point that the demand approaches the physical resource capacity of the satellite beam, the allocated resources for each fixed terminal and/or mobile user may be further constrained (e.g., by CIR, MinIR, etc.). While the provided capacity for each fixed terminal 130 and mobile user 180 is more constrained in FIG. 2B, each fixed terminal 130 and mobile user 180 may still receive a portion of system resources that is consistent with their service expectation based on the QoS specified in their SLAs. Multiplexed satellite beam resources 210-*b* may represent statistical multiplexing based on traffic policies (e.g., CIR, etc.), or may represent the physical resource capacity of the satellite beam, in some embodiments.

Figure 3A:
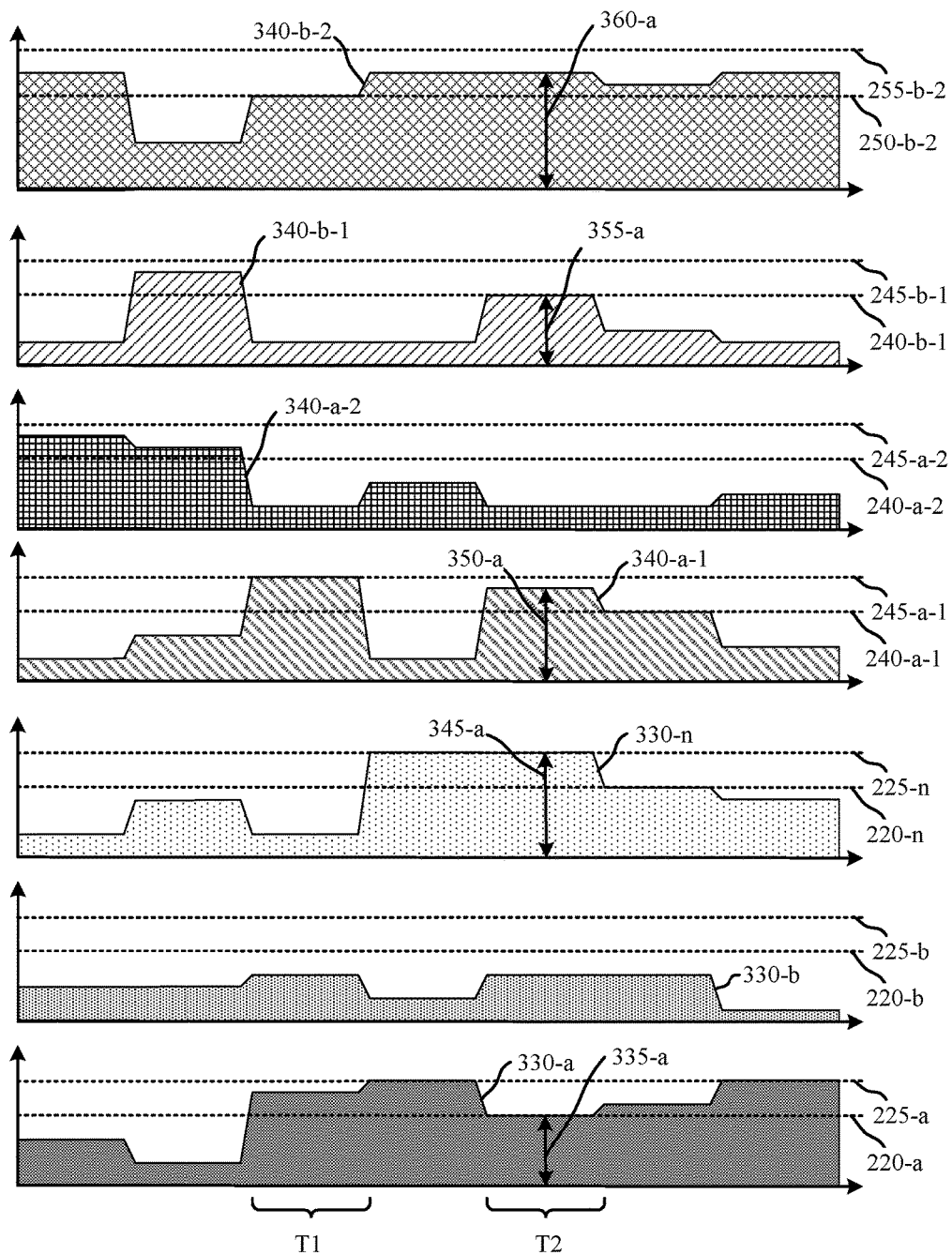
FIGS. 3A and 3B are diagrams illustrating dynamic multiplexing of traffic from fixed terminals and mobile users on the same satellite beam in accordance with various embodiments.
Figure 3B:
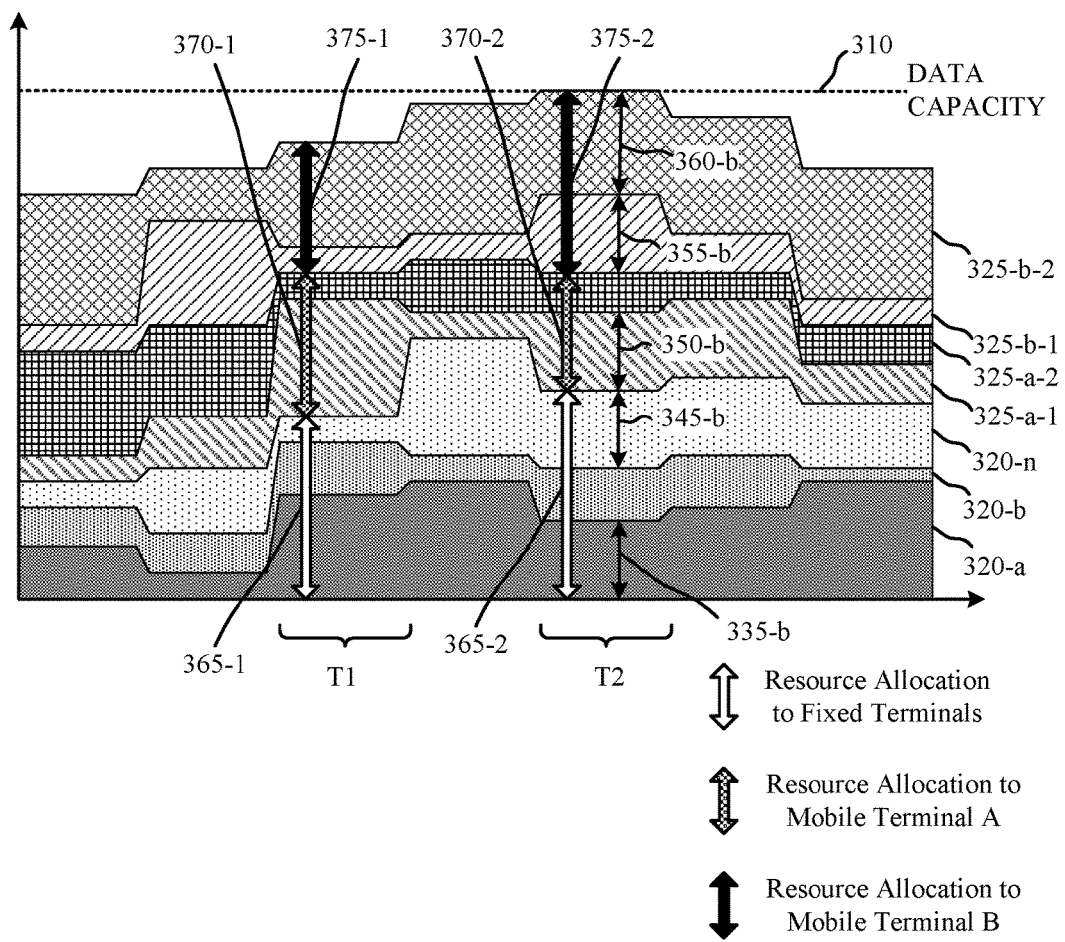

As described above, dynamic multiplexing of traffic from fixed terminals and mobile users on the same satellite beam can take advantage of statistical multiplexing of large numbers of users and on the different usage patterns between fixed terminals and mobile users. FIGS. 3A and 3B illustrate dynamic multiplexing of traffic from fixed terminals and mobile users on the same satellite beam in accordance with various embodiments. FIG. 3A may illustrate, for example, resource demands for satellite terminals ST1, ST2, and STN (e.g., satellite terminals 130-*a*, 130-*n*, etc.) and mobile devices A1, A2, B1, and B2 (e.g., associated with mobile users 180, etc.) over time. Mobile devices A1 and A2 may be connected to a mobile terminal A (e.g., mobile terminal 170-*a*) while mobile devices B1 and B2 may be connected to a different mobile terminal B 170. Each satellite terminal 130 may be provisioned for service according to terminal-specific traffic policies including CIR 220 and/or PIR 225. The users associated with mobile devices A1, A2, and B1 may be provisioned for service according to user-specific traffic policies including CIR 240 and/or PIR 245. The user associated with mobile device B2 may be provisioned for service according to user-specific traffic policies including CIR 250 and/or PIR 255, which may be, for example, a higher level of service than CIR 240 and/or PIR 245.

Over the time period illustrated in FIG. 3A, fixed terminals ST1, ST2, and STN may request resources illustrated by resource demands 330-*a*, 330-*b*, and 330-*n*, respectively. Mobile devices A1, A2, B1, and B2 may request resources illustrated by resource demands 340-*a*-1, 340-*a*-2, 340-*b*-1, and 340-*b*-2, respectively. Resource demands 330 and/or 340 may represent an amount of resources requested for transmission of data traffic (e.g., FL or RL) associated with a data traffic stream to or from each fixed terminal 130 and/or mobile device 175 over a beam of the satellite system.

FIG. 3B may illustrate scheduled resources for fixed terminals ST1, ST2, and STN, and mobile devices A1, A2, B1, and B2, and the resources 310 (e.g., data capacity of the beam) to be allocated to the fixed terminals and/or mobile devices serviced by the beam. System resources of the satellite beam 310 serving fixed terminals 130 (e.g., ST1, ST2, and STN), and mobile terminals 170 (e.g., mobile terminal A, mobile terminal B, etc.) may be broken up into different frequencies, carriers, spreading codes, and the like. Thus, the system resources 310 may be, for example, capacity of the beam (a portion or all) and may be allocated to fixed and/or mobile terminals by carriers, time division multiplexing, spreading codes, and the like.

As illustrated by FIG. 3B, resources may be dynamically allocated between fixed terminals and mobile users according to demand and provisioned traffic policies. Scheduled resource allocations illustrated in FIG. 3B include resource allocations 320-*a*, 320-*b*, and 320-*n* for fixed terminals ST1, ST2, and STN, respectively. The mobile users 180 may be scheduled according to resource allocations 325-*a*-1, 325-*a*-2, 325-*b*-1, and 325-*b*-2 for mobile devices A1, A2, B1, and B2, respectively. In FIG. 3B, resource allocations 320-*a*, 320-*b*, 320-*n*, 325-*a*-1, 325-*a*-2, 325-*b*-1, and 325-*b*-2 may represent amounts of resources used and may not represent a range of frequencies or carriers of the system bandwidth used by the respective terminals or mobile users. For example, for each time period, fixed terminals 130 and mobile devices 175 may be allocated the illustrated amount of resources on any available frequency range and/or carriers and the allocated frequency ranges and/or carriers for one fixed terminal 130 or mobile device 175 may vary with time.

At time T1, the satellite beam may be uncongested and fixed terminals 130 and mobile devices 175 may be allocated system resources based on their demand and associated traffic policies (e.g., up to PIR 225, 245, 255, etc.). Thus, at time T1, mobile terminal A may be allocated resources 370-1, mobile terminal B may be allocated resources 375-1, and fixed terminals ST1, ST2, and STN may be allocated resources 365-1.

At time T2, the amount of resource demands has increased, and the satellite beam resources 310 (e.g., data capacity) may be congested. As illustrated in FIG. 3A for time T2, fixed terminal ST1 may request resources 335-*a*, fixed terminal STN may request resources 345-*a*, mobile device A1 may request resources 350-*a*, mobile device B1 may request resources 355-*a*, and mobile device B2 may request resources 360-*a*. As illustrated in FIG. 3B, resources may be allocated at time T2 based on the demand of each fixed terminal 130, each mobile device 175 (or devices for a particular mobile user 180), and the terminal-specific and user-specific traffic policies to provide service according to the SLAs for each fixed terminal 130 and mobile user 180. In embodiments, data traffic streams associated with each fixed terminal and/or mobile device may be scheduled on resources according to demand and an associated CIR (e.g., CIR 220, 240, and/or 250, etc.). For example, fixed terminals ST1 and STN may be allocated resources 335-*b* and 345-*b* at time T2, respectively. Resources 335-*b* and 345-*b* may correspond to CIR 220-*a* and CIR 220-*n*, respectively. Mobile devices A1, B1, and B2 may be allocated resources 350-*b*, 355-*b*, and 360-*b* at time T2, respectively. Resources 350-*b*, 355-*b*, and 360-*b* may correspond to CIR 240-*a*-1, CIR 240-*b*-1, and CIR 250-*b*-2, respectively.

At time T2, mobile terminal A may be allocated resources 370-2, mobile terminal B may be allocated resources 375-2, and fixed terminals ST1, ST2, and STN may be allocated resources 365-2. Thus, each mobile terminal 170 may be allocated resources based on individual allocations for each connected mobile device 175, where resources for each connected mobile device 175 are allocated based on user-specific traffic policies of the associated mobile user 180. Additionally, the proportion of resources (e.g., beam bandwidth 310, etc.) allocated to all mobile terminals 170 may vary with time and according to demand and traffic policies.

Where congestion occurs for a satellite beam (e.g., at time T2), resources may be allocated to fixed terminals 130 and mobile users 180 first up to minIR or CIR, then additional available resources may be allocated (e.g., by fair sharing, weighted fair sharing, etc.) based on resource demand and a higher provisioned service level (e.g., PIR, etc.) for each fixed terminal 130 and mobile user 180. Where heavy congestion occurs (e.g., demands for resources at or exceeding minIR or CIR levels exceed the beam capacity), fair sharing or weighed fair sharing may be used to allocate resources to each fixed terminal 130 and mobile user 180 according to their resource demands and scaled provisioned levels. Additionally or alternatively, priority may be given for allocation of resources to some types of traffic (e.g., VoIP, streaming media, HTTP, etc.) over others. Resources may be allocated for each mobile terminal 170 based on the aggregate resources allocated to mobile users 180 accessing the satellite network access system through the mobile terminal 170.

Increasing the number of users and types of use (e.g., fixed terminals vs. mobile users, etc.) may increase the efficiency of statistical multiplexing for beams of the satellite system. For example, a statistical multiplexing factor (e.g., 5×, 10×, 100×, etc.) of provisioned PIR usage vs. physical satellite resources may be increased if different types of users have different resource use profiles. For example, fixed terminals may typically use more resources during evening hours while mobile users receiving service on airplanes may tend to use more resources in the early morning and afternoon when a higher proportion of flights are in the air.

Figure 4:
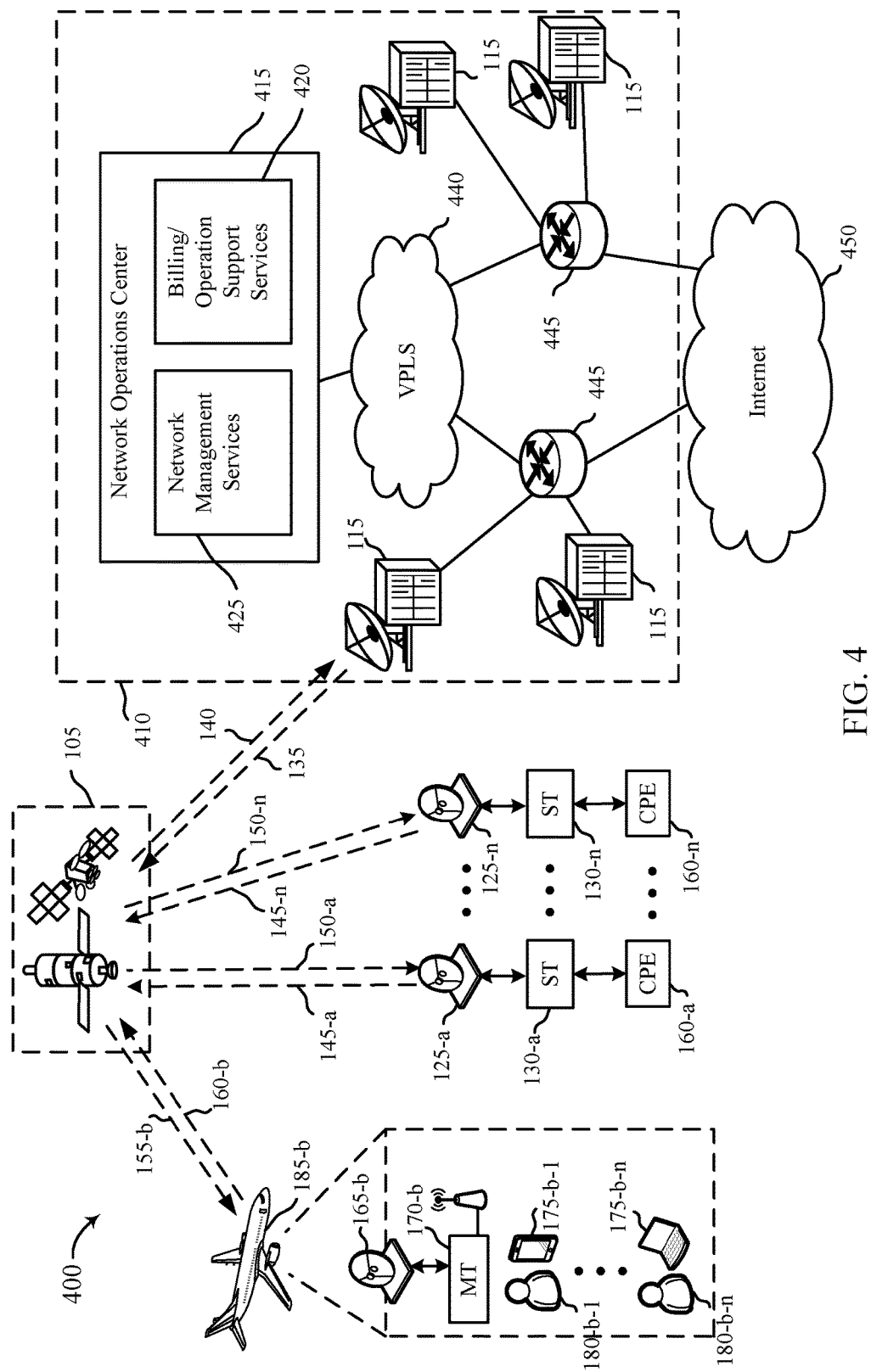
FIG. 4 is a diagram of aspects of a satellite communications system for providing network access service to mobile users via mobile terminals with per-user quality of service in accordance with various embodiments.

FIG. 4 is a diagram of aspects of a satellite communications system 400 for providing network access service to mobile users via mobile terminals with per-user QoS in accordance with various embodiments. Satellite communications system 400 includes a ground-based service provider network 410 and one or more satellites 105 providing network access service to mobile users 180 using mobile devices 175 via mobile terminals 170. The satellite(s) 105 may be multi-beam satellites and may communicate with satellite gateways 115 via forward links 135 and return links 140 (e.g., via a feeder beam of the satellite(s) 105). The satellite(s) 105 may communicate with the mobile terminals 170 over forward links 155 and return links 160 (e.g., via a service beam of the satellite(s) 105). Forward links 155 and return links 160 may be established via a first service beam of the multi-beam satellite system and may be transitioned to a second, different service beam (e.g., handover of the mobile terminal) based on mobility of the mobile terminal 170 (e.g., movement from the coverage area of the first service beam to the coverage area of the second service beam). The second service beam may be a second service beam of the same satellite or a service beam of a second satellite of the satellite communication system 400.

In some embodiments of the satellite communication system 400 having multiple satellites 105 supporting network access communication service for mobile users 180 via mobile terminals 170, one or more satellites 105 may support higher capacity beams (e.g., higher gain spot beams, etc.) than others of the multiple satellites 105. In some cases, a higher capacity beam may be capable of providing higher service levels (e.g., a higher data rate, etc.) for fixed terminals 130 and mobile terminals 170 serviced by the higher capacity beam. Thus, the data rate (e.g., in Mbps, etc.) for a mobile device 175 may depend on the capacity of the beam servicing the mobile device 175 (via mobile terminals 170), and may vary as the mobile device 175 connects to the satellite system via different mobile terminals or the mobile terminal 170 providing service to the mobile device 175 transitions from being served by one beam to another. However, the data rate provided for a given mobile device 175 may still depend on the SLA for the mobile user 180 associated with the mobile device 175. For example, when a mobile device 175 of a first mobile user 180 is provided service via a first beam with lower gain or higher congestion, the mobile device 175 may be provided a first data rate (e.g., by scheduling and/or traffic shaping) that depends on the service level (e.g., MinIR, CIR, PIR, etc.) of the SLA of the first mobile user 180 in relation to the service levels of other mobile users 180 and fixed terminals 130 serviced by the first beam. When the mobile device 175 is provided service via a second beam (e.g., via mobility of the mobile device 175 and associated mobile terminal 170 or connection to a different mobile terminal 170 in a different location, etc.) having higher gain or lower congestion, the mobile device may be provided a second data rate that is higher than the first data rate, where the second data rate depends on the service level (e.g., MinIR, CIR, PIR, etc.) of the SLA of the first mobile user 180 in relation to the service levels of other mobile users 180 and fixed terminals 130 serviced by the second beam.

The satellite provider network 410 may include satellite gateways 115, core nodes 445, and network operations center (NOC) 415. NOC 415 may manage satellite operations and network traffic. The satellite system provider network 410 may include a network operations center (NOC) 415, one or more core nodes 445 for managing and controlling traffic flow in network 410, and satellite gateways 115. Satellite service provider network 410 may also be connected to the Internet 450 and/or other networks such as content delivery networks (CDNs), private networks, and the like (not shown). NOC 415 may include network management services (NMS) 425 and/or billing/operation support systems (B/OSS) 420. NMS 425 may manage configuration and monitoring of network 410 and may include systems for network fault management, performance monitoring, configuration management, and/or network diagnostics. B/OSS 420 may include policy management and billing/reporting functions. NOC 415 and core nodes 445 may be connected through various networking connections and/or protocols, for example, virtual private LAN service 440.

In communications system 400, multiple mobile users 180 are provided network access services via each mobile terminal 170. Mobile users 180 may use mobile devices 175 to connect to mobile terminals 170 using wired or wireless (e.g., Wi-Fi, Ethernet, etc.) connections. Each mobile user 180 signs up for network access service via communications system 400 according to an SLA and the mobile users 180 are provisioned and allocated system resources of the satellite communications system 400 according to their demand and the traffic policies associated with their SLAs. For example, data traffic streams between each mobile user on airplane 185-b and the Internet 450 may be individually managed so that QoS for each user is largely unaffected by data usage of other users on airplane 185-b. Management of data traffic streams for each mobile user may be performed by scheduling transmissions of the data traffic streams individually and/or traffic shaping of the data traffic streams individually.

In embodiments, satellite communications system 400 manages addressing and traffic flow for mobile devices 175 connected to mobile terminals 170 in a way that data traffic for individual mobile devices 175 can be identified within the satellite provider network 410. In one example, each mobile device 175 is assigned a public IP address (e.g., public IPv4 or public IPv6 address) and traffic is managed for each mobile device 175 based on the assigned public IP addresses. In alternative embodiments, techniques for creating one or more virtual LANs (VLANs) over satellite communications system 400 may be used to manage traffic flows for mobile devices 175 on an individual basis. For example, a separate VLAN may be set up for each mobile terminal 170, each user, and/or each mobile device 175, where each VLAN provides a separate virtual network for traffic to and from the service provider network and the mobile terminal 170 and/or the mobile devices 175. In this way, traffic for each mobile device of the VLAN can be identified by the service provider network and managed on a per-user and/or per mobile device basis. In yet other alternative embodiments, tunneling protocols (e.g., GRE, etc.) may be used to identify individual traffic streams associated with each mobile device 175 in the service provider network for managing traffic flow on an individual mobile device and/or mobile user basis. Each mobile device may be assigned a separate tunneling protocol address identifiable to the service provider network while payload addresses (e.g., IP address of the mobile terminal 170) for multiple devices may be the same.

Traffic flow management may be performed by scheduling and/or traffic shaping. As described above, scheduling of data traffic for traffic streams associated with each fixed terminal 130 and each mobile device 175 may be based on the resource demands of the traffic streams and the provisioned service levels for the mobile terminals 130 and the mobile users 180 associated with each mobile device 175. Thus, resource allocations for scheduled time periods (frames, epochs, etc.) for each mobile terminal 170 may be variable portions of resources of a satellite beam shared with fixed terminals 130 serviced by the satellite beam.

In embodiments, satellite communications system 400 employs forward-link traffic shaping at the service provider network 410 and/or return-link traffic shaping at the multi-user satellite terminals 170 as described in more detail below. Forward-link traffic shaping may be performed for each mobile device 175 by identifying downstream traffic destined for the mobile device 175 and managing the traffic flow individually for the mobile device according to traffic policies associated with the mobile device 175. Forward-link traffic shaping may be performed at the core nodes 445, or in the gateways 115 in some embodiments. Return-link traffic shaping may be performed individually for each mobile device 175 by identifying uplink traffic from each mobile device at the mobile terminal and managing the uplink traffic flow individually for each mobile device 175 (e.g., based on the user-specific traffic policies of the mobile users 180 associated with the mobile devices 175).

In embodiments, functions of the satellite provider network 410 for managing traffic flow to provide per-user QoS via the multi-user satellite terminals 170 are performed in the core nodes 445. However, managing traffic flow may be performed in other entities of the satellite provider network 410 including gateways 115 and/or other entities.

Figure 5:
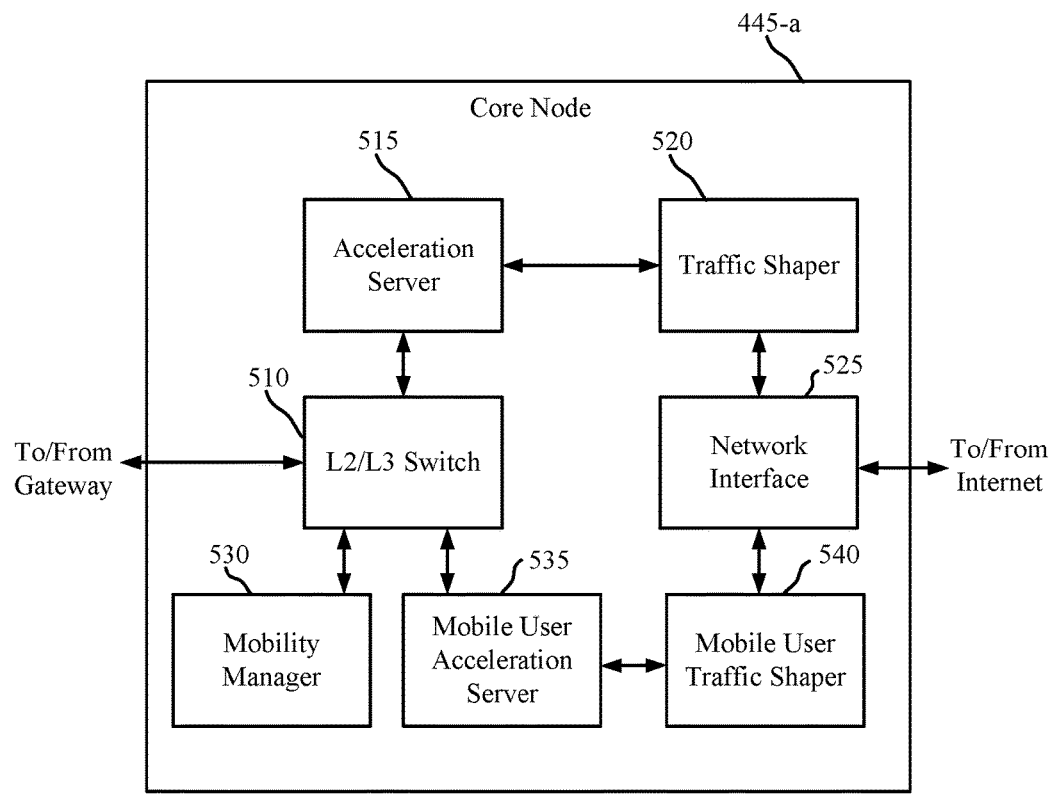
FIG. 5 is a block diagram of a core node for managing traffic flow to provide per-user quality of service in accordance with various embodiments.

FIG. 5 is a block diagram of a core node 445-*a* for managing traffic flow to provide per-user QoS in accordance with various embodiments. Core node 445-*a* may illustrate, for example, aspects of core nodes 445 of FIG. 4. Core node 445-*a* may include L2/L3 switch 510, acceleration server 515, traffic shaper 520, network interface 525 (e.g., access service network gateway (ASN-GW), etc.), mobility manager 530, mobile user acceleration server 535, and/or mobile user traffic shaper 540. Mobility manager 530 may manage mobility of mobile terminals 170 and/or mobile devices 175 (e.g., between satellite beams, etc.).

Core node 445-*a* may receive traffic from external networks (e.g., the Internet) via network interface 525 and perform traffic shaping and/or acceleration of the traffic for transmission of the traffic to the destination devices via the satellite(s) 105. Acceleration server 515 and mobile user acceleration server 535 may use various protocols for accelerating network traffic transmitted and received via satellite(s) 105. For example, packet payloads may be replaced with an acceleration protocol configured to allow for various acceleration techniques to be performed on the payloads. For example, acceleration techniques include compression, byte caching, prefetching, multicasting, delta coding, and the like.

In embodiments, the core node 445-*a* may include separate traffic shaping and acceleration paths for traffic to the fixed satellite subscriber terminals and mobile users as illustrated in FIG. 5. In alternative embodiments, the functions of mobile user traffic shaper module 540 may be implemented in traffic shaper module 520 and the functions of mobile user acceleration server 535 may be implemented in acceleration server 515. Traffic shaper 520 may identify and shape FL data traffic streams for transmission to fixed terminals 130 and mobile user traffic shaper 540 may identify and shape FL data traffic streams to be transmitted to mobile devices associated with mobile users, as described in more detail below.

Figure 6:
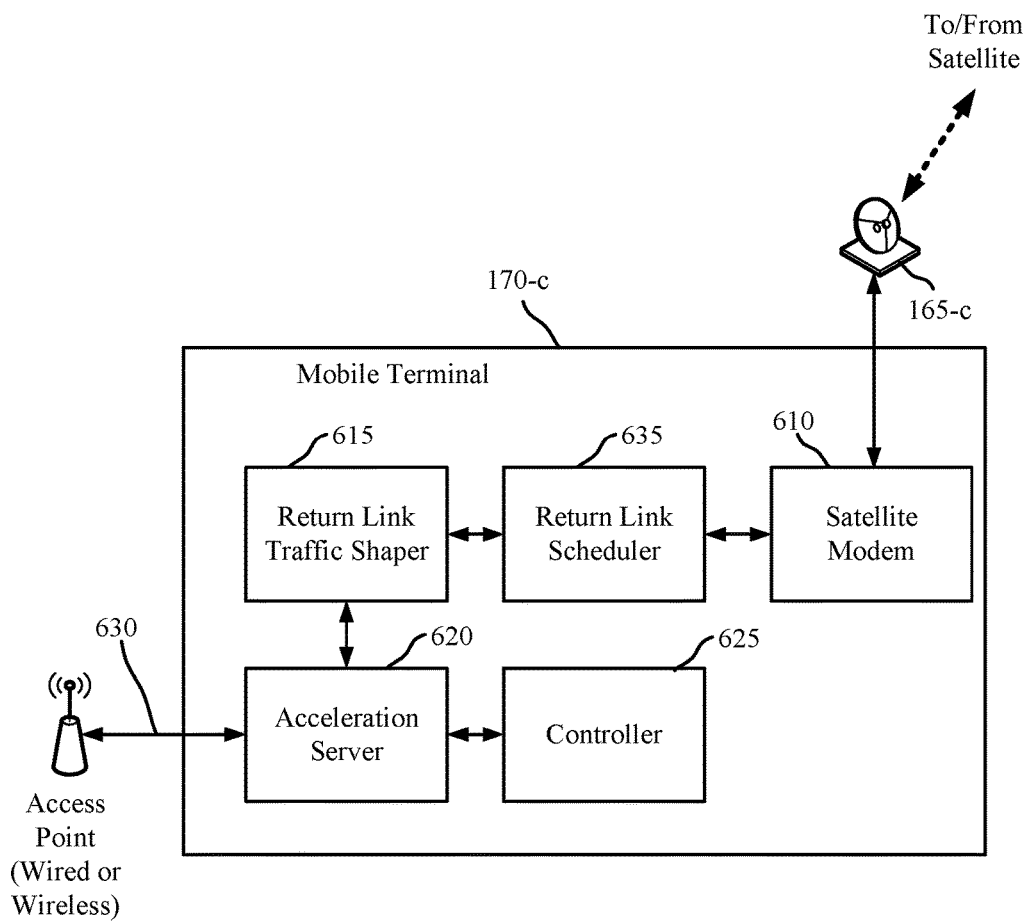
FIG. 6 is a block diagram of a mobile terminal in accordance with various embodiments.

FIG. 6 is a block diagram of a mobile terminal 170-*c* in accordance with various embodiments. Mobile terminal 170-*c* may illustrate, for example, aspects of the mobile terminals 170 of FIGS. 1 and/or 4. Mobile terminal 170-*c* may include satellite modem 610, return link traffic shaper 615, acceleration server 620, controller 625, and return link scheduler 635.

Satellite modem 610 manages communications between the mobile terminal 170-*c* and satellite(s) 105 via satellite antenna 165-*c*. Satellite modem 610 may be configured to communicate with satellite(s) 105 over one or more frequency bands (e.g., Ka, Ku, etc.) and may be configured to automatically orient antenna 165-*c* to transmit signals to and receive signals from satellite(s) 105 even when mobile (e.g., mounted on an airplane, boat, etc.). Satellite modem 610 may be configured to receive service from a service beam of the satellite system and may be configured to switch service between beams (e.g., as controlled by mobility manager 530, etc.) as the mobile terminal 170-*c* moves within a service area of the satellite system.

Mobile devices connect to mobile terminal 170 through satellite terminal interface 630, which may support connection to various access points including wired and/or wireless connections such as Wi-Fi, Ethernet, and the like. Controller 625 may receive service requests from mobile devices 175 and communicate with the service provider network (e.g., via satellite(s) 105) to receive account information (e.g., traffic policies, etc.) for mobile users associated with the mobile devices 175. For example, controller 625 may provide support for users signing up for new service and/or signing in for service according to an existing SLA.

Acceleration server 620 may perform similar techniques for accelerating data traffic transmitted and received over satellite(s) 105 as described above with reference to mobile user acceleration server 535.

In embodiments, mobile terminal 170-c supports per-user traffic flow management for communication services provided via mobile terminal 170-c. Per-user traffic flow management may include per-user resource scheduling and/or per-user traffic shaping. In some embodiments, return link scheduler 635 receives return link resource allocations for the mobile terminal 170-c (e.g., allocated based on resource demands for fixed terminals and mobile users as described above with reference to FIGS. 3A and 3B, etc.) and schedules data traffic from mobile devices 175 connected to the mobile terminal 170-c for transmission on the return link resource allocations. The return link scheduler 635 may allocate the return link resource allocations among data traffic streams associated with the mobile devices 175 according to the user-specific traffic policies for users associated with each mobile device 175. For example, the return link scheduler 635 may allocate the return link resource allocations according to the user-specific traffic policies, providing return link resources for each mobile device weighted according to the user-specific traffic policies associated with the mobile device. Additionally or alternatively, the return link scheduler 635 may give priority to some types of traffic (e.g., VoIP, streaming media, HTTP, etc.) over others.

In some embodiments, mobile terminal 170 includes return link traffic shaper 615 for shaping return link traffic flow on a per-user basis and/or applying fairness policies to return link traffic flows from multiple mobile devices according to traffic policies associated with the mobile users. The functionality of return link traffic shaper 615 is described in more detail below.

Figure 7:
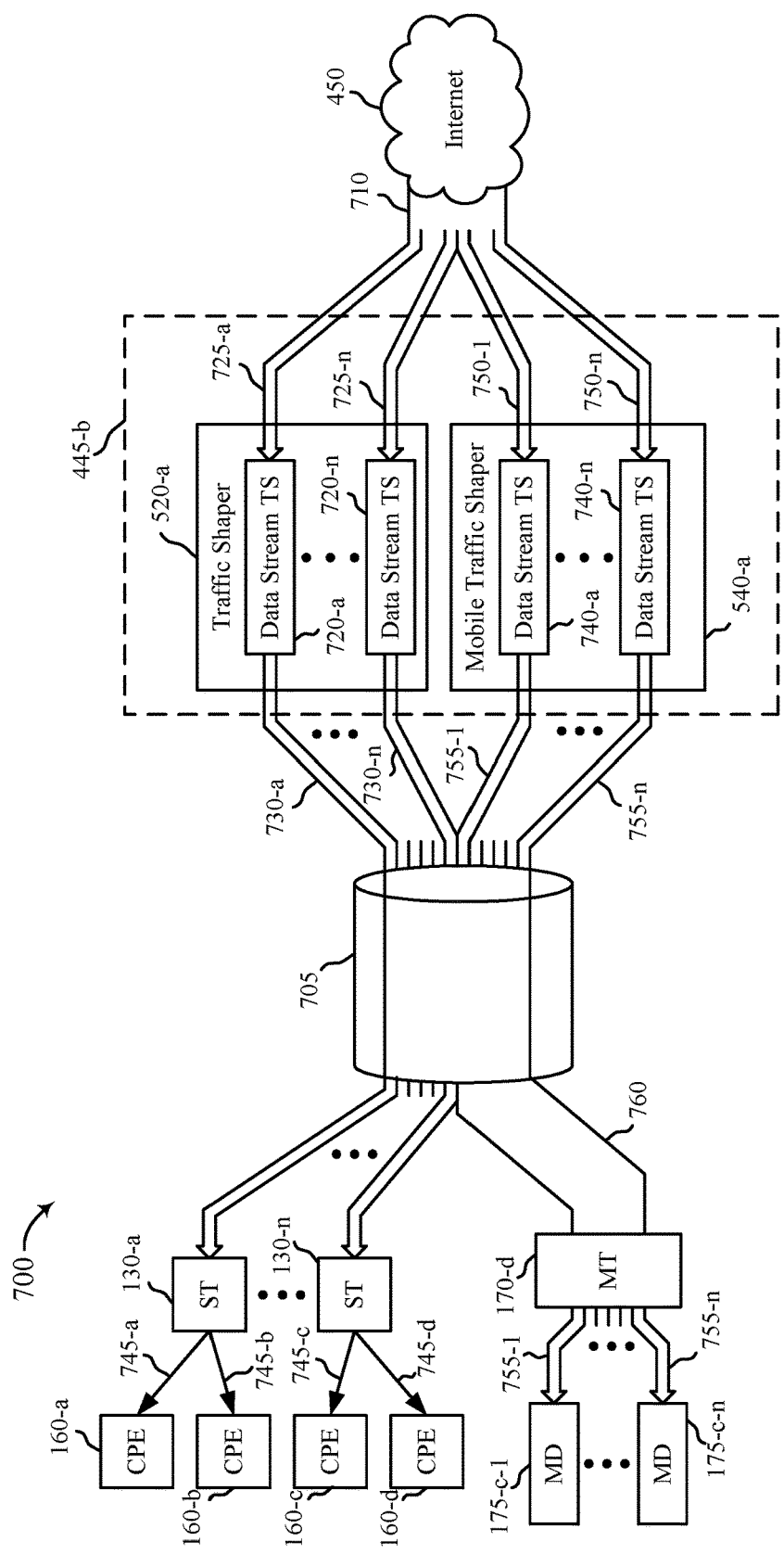
FIG. 7 is a simplified diagram illustrating aspects of providing per-user quality of service for mobile users connected to mobile terminals in accordance with various embodiments.

FIG. 7 is a simplified diagram 700 illustrating aspects of providing per-user QoS for mobile devices connected to mobile terminals in accordance with various embodiments. FIG. 7 may illustrate, for example, aspects of systems 100 and/or 400 for providing forward link traffic shaping on a per-user basis for mobile devices 175 connected to a mobile terminal 170.

As illustrated in FIG. 7, multiple satellite terminals 130-a to 130-n may be provided satellite network access service via a satellite beam 705 of a multi-beam satellite 105. One or more CPEs 160 may be connected to each satellite terminal 130. Each satellite terminal 130 may be assigned a public IP address (e.g., public IPv4 or IPv6 address) and may provide NAT services to the connected CPEs 160. Each satellite terminal 130 may be associated with terminal-specific traffic policies. The terminal-specific traffic policies may correspond to an SLA between the subscriber associated with the terminal and the satellite network provider.

In diagram 700, forward link-traffic 710 is received (e.g., from the Internet 450 or other network) at core node 445-b. Core node 445-b may identify individual traffic streams (e.g., by destination IP address, VLAN tag, socket port number, etc.) and separate the streams for forward link traffic shaping by traffic shaper 520-a and/or mobile traffic shaper 540-a. While traffic shaper 520-a and mobile traffic shaper 540-a are illustrated in FIG. 5 as separate modules, these functions may be combined in a single traffic shaper module in some embodiments.

Mobile devices 175-c-1 to 175-c-n connect to mobile terminal 170-d, which also provides network access service via satellite beam 705 (e.g., located on an airplane located within the coverage area of beam 705). Each mobile user associated with mobile devices 175-c-1 to 175-c-n may have an existing SLA with the satellite network service provider, or may sign up for service upon connecting to mobile terminal 170-d. When mobile devices 175-c-1 to 175-c-n connect to mobile terminal 170-d, the mobile devices 175 may be associated with user-specific traffic policies according to the SLAs of the mobile users.

Traffic shaper 520-a may manage forward link traffic flow to each satellite terminal 130 on a per-terminal basis. For example, data streams 725-a to 725-n associated with terminals 130-a to 130-n may be received at the traffic shaper 520-a. Each data stream 725 may include forward link data traffic destined for multiple CPEs connected to the satellite terminal 130. For example, data stream 725-a may include FL data traffic for CPE 160-a and CPE 160-b in a single data stream with a single destination address (e.g., public IP address). Data stream traffic shapers 720 may manage data streams 725 according to the amount of resources requested for data streams 725, the terminal-specific traffic policies associated with fixed terminals 130, and the amount of resources requested by other fixed terminals 130 and/or mobile devices 175. Data stream traffic shapers 720 output shaped data streams 730 for transmission via satellite beam 705 to terminals 130. For example, fixed terminal 130-a may be provisioned for service at a PIR of 5 Mb/s. Data stream 725-a may be received at data stream traffic shaper with a traffic rate of 7 Mb/s. Data stream traffic shaper may perform traffic shaping to output shaped data stream 730-a at the PIR for fixed terminal 130-a of 5 Mb/s. Terminal 130-a receives shaped data stream 730-a and performs NAT or other addressing functions and sends the data (e.g., data 745-a and/or data 745-b) to the appropriate CPE 160.

Mobile traffic shaper 540-a may manage forward link traffic flow to each mobile device 175 on a per-user basis. As illustrated in FIG. 7, data streams 750-1 to 750-n may be received at the mobile traffic shaper 540-a and the mobile traffic shaper 540-a may identify the data streams 750-1 to 750-n as associated with mobile devices 175-c-1 to 175-c-n, respectively. Data stream traffic shapers 740-a to 740-n may manage data flow of data streams 750-1 to 750-n according to the amount of resources requested for the data streams, the user-specific traffic policies for the mobile users 180 associated with mobile device 175-c-1 (or set of mobile devices as described below), and the amount of resources requested by other terminals and/or mobile devices. Data stream traffic shapers 740-a to 740-n output shaped data streams 755-1 to 755-n, for transmission via satellite beam 705 in data stream 760 to mobile terminal 170-d. Mobile terminal 170-d receives traffic stream 760 including shaped data streams 755-1 to 755-n and forwards the individual shaped data streams 755-1 to 755-n (e.g., over Wi-Fi, Ethernet, and the like) to the destination mobile devices 175-c-1 to 175-c-n. Forward link resources for data stream 760 may be allocated on satellite beam 705 for mobile terminal 170-d according to the aggregate resources of the shaped data streams 755.

Data stream traffic shapers 720, 740 may employ various techniques for controlling the volume of traffic of data streams including delaying packets, dropping packets, packet marking, and/or other techniques. Data stream traffic shapers 720, 740 may also shape traffic streams according to traffic classification. For example, data stream traffic shapers 720, 740 may give priority to some types of traffic (e.g., VoIP, streaming media, HTTP, etc.) over others.

In some embodiments, each illustrated mobile device 175 may include multiple mobile devices associated with a single SLA. For example, a mobile user (or users) may sign up for service according to an SLA and then register multiple mobile devices for service under the SLA. In this instance, the multiple mobile devices may be associated with a single set of user-specific traffic policies according to the SLA. Thus, the multiple mobile devices associated with the SLA may be treated as a single device for traffic flow management purposes. As such, the total forward link data traffic for the multiple mobile devices may be managed according to the user-specific traffic policies of the SLA associated with the user or users.

Figure 8:
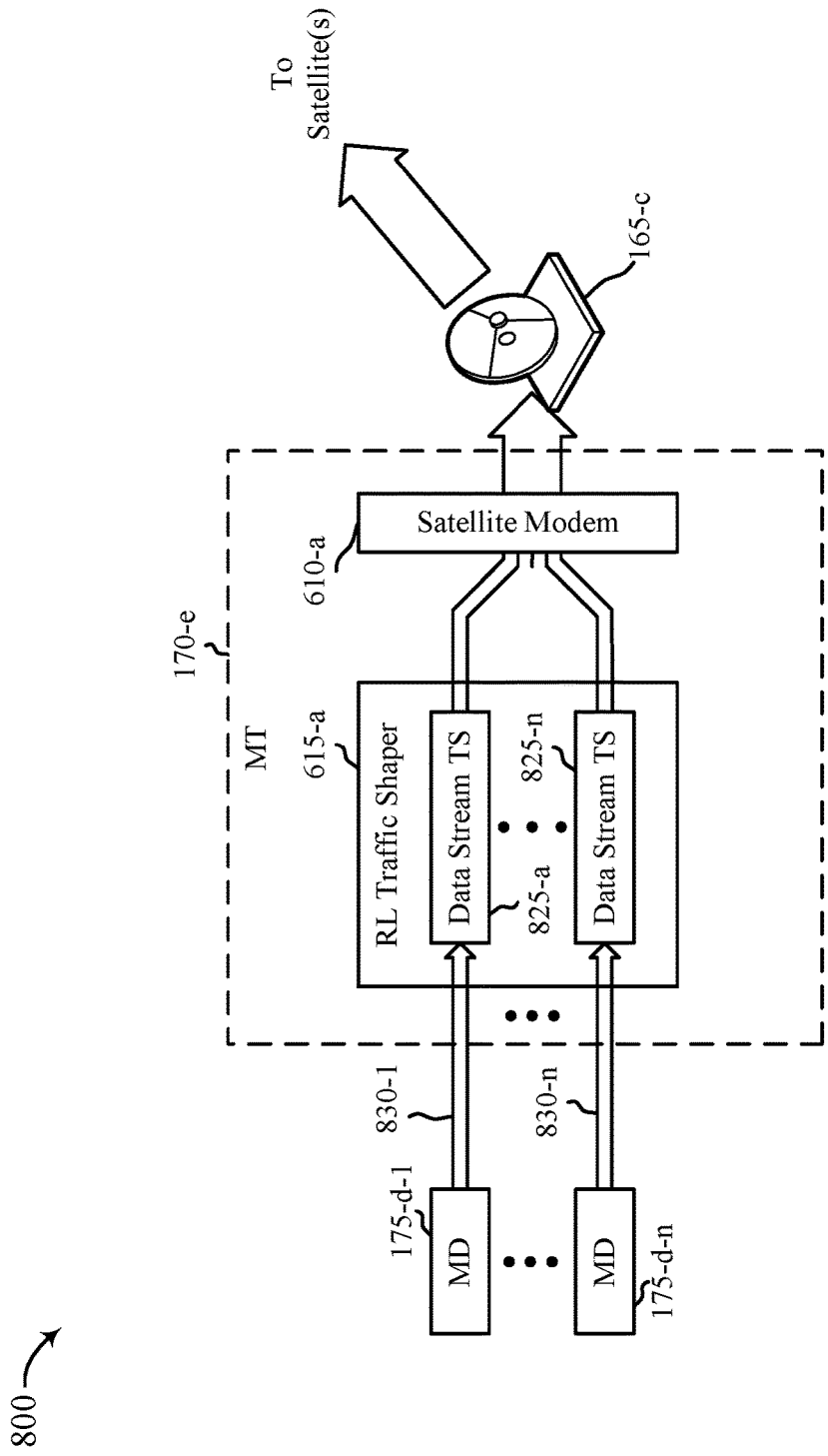
FIG. 8 is a simplified diagram illustrating aspects of return link traffic shaping for providing per-user quality of service for mobile users connected to mobile terminals in accordance with various embodiments.

FIG. 8 is a simplified diagram 800 illustrating aspects of return link traffic shaping for providing per-user QoS for mobile devices connected to mobile terminals in accordance with various embodiments. FIG. 8 may illustrate, for example, aspects of systems 100 and/or 400 for providing return link traffic shaping on a per-user basis for mobile devices connected to a mobile terminal 170.

In FIG. 8, mobile devices 175-d-1 to 175-d-n connect to mobile terminal 170-e for network access service. Each mobile user of mobile devices 175-d-1 to 175-d-n may have an existing SLA with the satellite network service provider, or may sign up for service upon connecting to mobile terminal 170-e. When mobile devices 175-d-1 to 175-d-n connect to mobile terminal 170-e, the mobile devices 175 may be associated with user-specific traffic policies according to the SLAs of the mobile users. For example, upon receiving a service request (e.g., a new user signing up for service or a returning user signing in) for a mobile device, mobile terminal 170-e may communicate with the satellite provider network to receive the user-specific traffic policies associated with the user. Subsequently, the user-specific traffic policies may be used for return-link traffic shaping of return link data streams sent from the mobile device.

As illustrated in FIG. 8, multiple return link data streams 830-a to 830-n are received at mobile terminal 170-e for transmission to an external network (e.g., the Internet). Return link traffic shaper 615-a may individually manage the traffic flows for data streams 830 based on an allocation of resources to satellite modem 610-a, the resources requested by data streams 830, and the user-specific traffic policies associated with the users of mobile devices 175. For example, return link resource allocations for the service beam that provides service to mobile terminal 170-e may be scheduled by the service provider network. Satellite modem 610-a may request uplink resources in an amount based on the amount of data traffic in data streams 830 received at the mobile terminal 170-e and the user-specific traffic policies for all users. For example, Satellite modem 610-a may request uplink resources for the service beam based on aggregate resources for transmitting the data in data streams 830, up to a point where the data streams 830 exceed the user-specific traffic policies. Where data streams 830 exceed the user-specific traffic policies (e.g., PIR, etc.), the satellite modem 610-a may request uplink resources based on the user-specific traffic policies instead of the demand requested by the data streams 830. Based on the congestion of the satellite beam at the time of allocating resources, the satellite modem 810-a may not be allocated the same amount requested by the satellite modem 610-a. If the allocated amount is less than the requested amount, the allocated amount may be distributed among the mobile devices 175 according to the user-specific traffic policies associated with the mobile devices 175.

Figure 9:
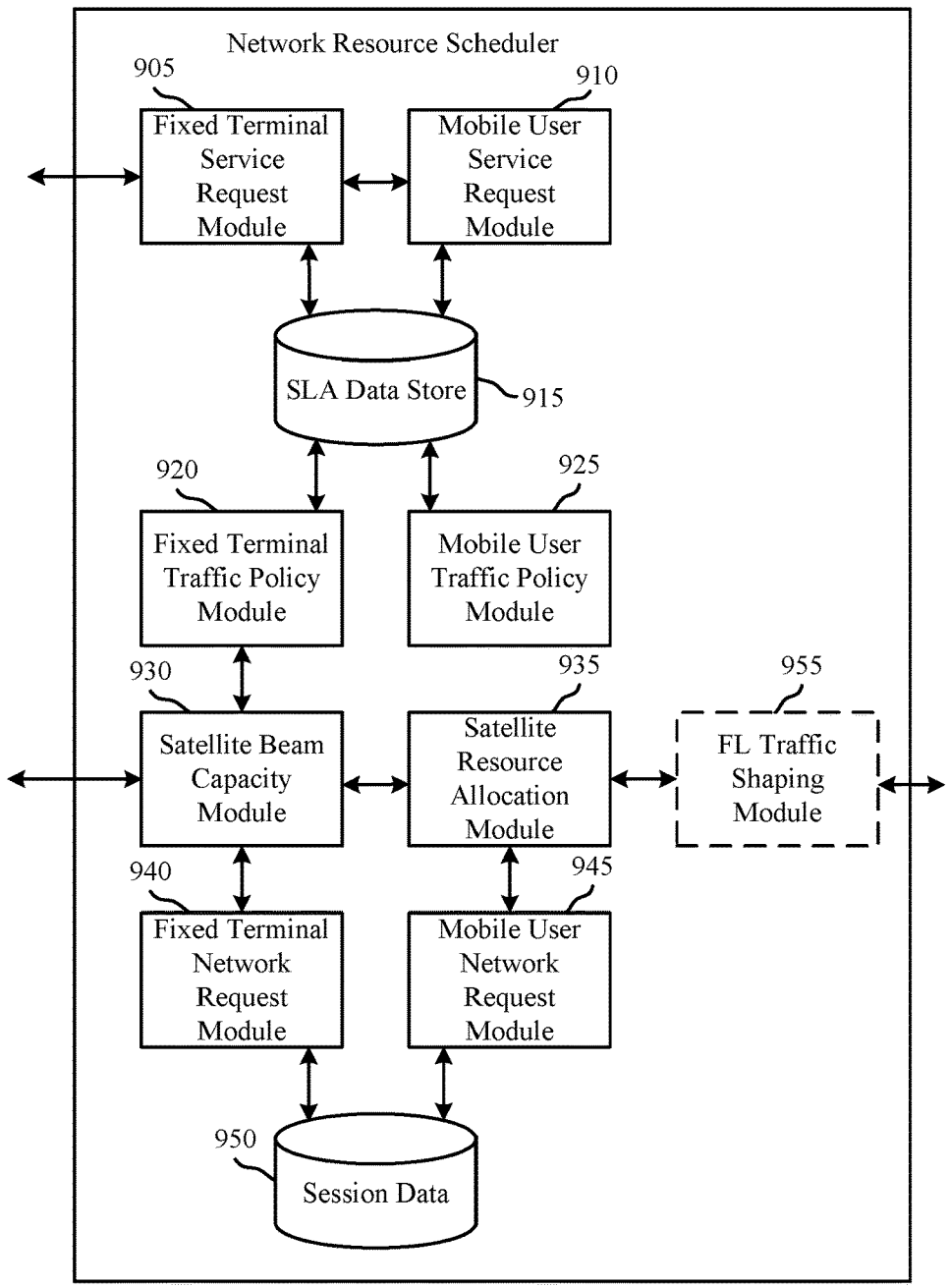
FIG. 9 illustrates a block diagram of a network resource scheduler in accordance with various embodiments

FIG. 9 illustrates a block diagram of a network resource scheduler 900 in accordance with various embodiments. The network resource scheduler 900 may illustrate, for example, aspects of gateways 115, core nodes 445, and/or network operations center 415 of FIGS. 1, 4, 5, and/or 7. The network resource scheduler 900 of the present example includes a fixed terminal service request module 905, a mobile user service request module 910, an SLA data store 915, a fixed terminal traffic policy module 920, a mobile user traffic policy module 925, a satellite beam capacity module 930, a satellite resource allocation module 935, a fixed terminal network request module 940, a mobile user network request module 945, and a session data store 950. Each of these components may be in communication with each other, directly or indirectly. In certain examples, the network resource scheduler 900 may be implemented by a single physical device or component. Alternatively, the functionality of the network resource scheduler 900 may be spread across multiple geographically separate devices and systems. For example, the satellite beam capacity module 930, satellite resource allocation module 935, the fixed terminal network request module 940, and/or the mobile user network request module 945 may be implemented at a central core node that coordinates communication of the satellite communications systems 100 and/or 400 illustrated in FIGS. 1 and/or 4.

The fixed terminal service request module 905 may receive service requests from fixed satellite terminals 130. The service requests may be associated with terminal-specific service level agreements (SLAs). The terminal-specific SLAs may define, for example, the level of service to be provided by the satellite network provider to the subscriber of the communication service associated with the fixed satellite terminal 130. The level of service may be defined by, for example, rate-based, usage-based, and/or time based service parameters.

The mobile user service request module 910 may receive service requests from mobile devices. The service requests may be associated with user-specific SLAs of mobile users 180. The mobile users may have an existing SLA with the satellite networking provider or may sign up for service according to an SLA upon connecting to one of the mobile terminals.

Fixed terminal traffic policy module 920 may assign terminal-specific traffic policies to each fixed satellite terminal according to the associated terminal-specific SLA. The fixed terminal traffic policy module 920 may retrieve information related to SLAs between the satellite network service provider and fixed-terminal subscribers from the SLA data store 915 for assigning terminal-specific traffic policies to fixed terminals based on service requests received by fixed terminal service request module 905. The terminal-specific traffic policies may specify traffic flow management parameters (e.g., MinIR, CIR, PIR, etc.) for managing traffic flow to data streams (e.g., FL and/or RL) for each terminal.

Mobile user traffic policy module 925 may assign user-specific traffic policies to each mobile device according to the associated user-specific SLA. The mobile user traffic policy module 925 may retrieve information related to SLAs between the satellite network service provider and mobile users from the SLA data store 915 for assigning user-specific traffic policies to mobile devices based on service requests received by mobile user service request module 910. The user-specific traffic policies may specify traffic flow management parameters (e.g., MinIR, CIR, PIR, etc.) for managing data streams (e.g., FL and/or RL) for each mobile user. Mobile user traffic policy module 925 may transmit user-specific traffic policies to mobile terminals 170 for traffic management (e.g., scheduling, traffic shaping, etc.) at the mobile terminals 170 according to the user-specific traffic policies.

Fixed terminal network request module 940 may receive resource requests from fixed satellite terminals serviced via a first satellite beam of the multi-beam satellite. Each fixed satellite terminal resource request may be associated with a data traffic stream. The fixed satellite resource requests may be associated with FL data traffic streams or RL data traffic streams.

Mobile user network request module 945 may receive resource requests from mobile devices via a mobile terminal. The mobile terminal may be serviced via the first satellite beam. Each mobile device resource request may be for data traffic of a data traffic stream associated with a mobile device connected to the mobile terminal. The mobile device resource requests may be associated with FL data traffic streams or RL data traffic streams Satellite beam capacity module 930 may identify beam resources of the first satellite beam for supporting the resource requests received from the fixed satellite terminals and the mobile terminal. The identified beam resources may be a portion of or all beam resources of the first satellite beam. The identified beam resources may include, for example, frequency, polarization, and/or time resources for transmission of data over the first satellite beam.

Satellite resource allocation module 935 may allocate the identified beam resources to the fixed satellite terminals and to the mobile users connected to the mobile terminal. The identified beam resources may be allocated according to the amount of the resource requests from each of the fixed satellite terminals and mobile users, as well as the terminal-specific traffic policies associated with the fixed satellite terminals and the user-specific traffic policies associated with the mobile users. The amount of resources allocated to fixed and mobile terminals may vary with time and according to demand and traffic policies.

FL traffic shaping module 955 may perform forward link traffic shaping for data traffic streams for the fixed terminals and the mobile users. FL traffic shaping module 955 may include aspects of traffic shapers 520 and/or mobile user traffic shapers 540 as described with reference to FIG. 5 and FIG. 7. For example, FL traffic shaping module 955 may shape data traffic streams for individual fixed terminals based on the terminal-specific traffic policies associated with the fixed terminals. FL traffic shaping module 955 may shape data traffic streams for mobile devices based on the user-specific traffic policies of the mobile users associated with the mobile devices. For example, FL traffic shaping module 955 may identify individual forward link data traffic streams destined for mobile devices serviced by a mobile terminal 170 based on public IP addresses, VLAN tags, and/or tunneling protocol headers of the forward link data traffic streams. One mobile user may be identified with multiple mobile devices and the FL traffic shaping may be performed based on an aggregated data traffic stream for the mobile devices associated with the single mobile user. FL traffic shaping module 955 may communicate with session data store 950 for managing traffic flow including packet buffering and/or traffic usage profile information.

Figure 10:
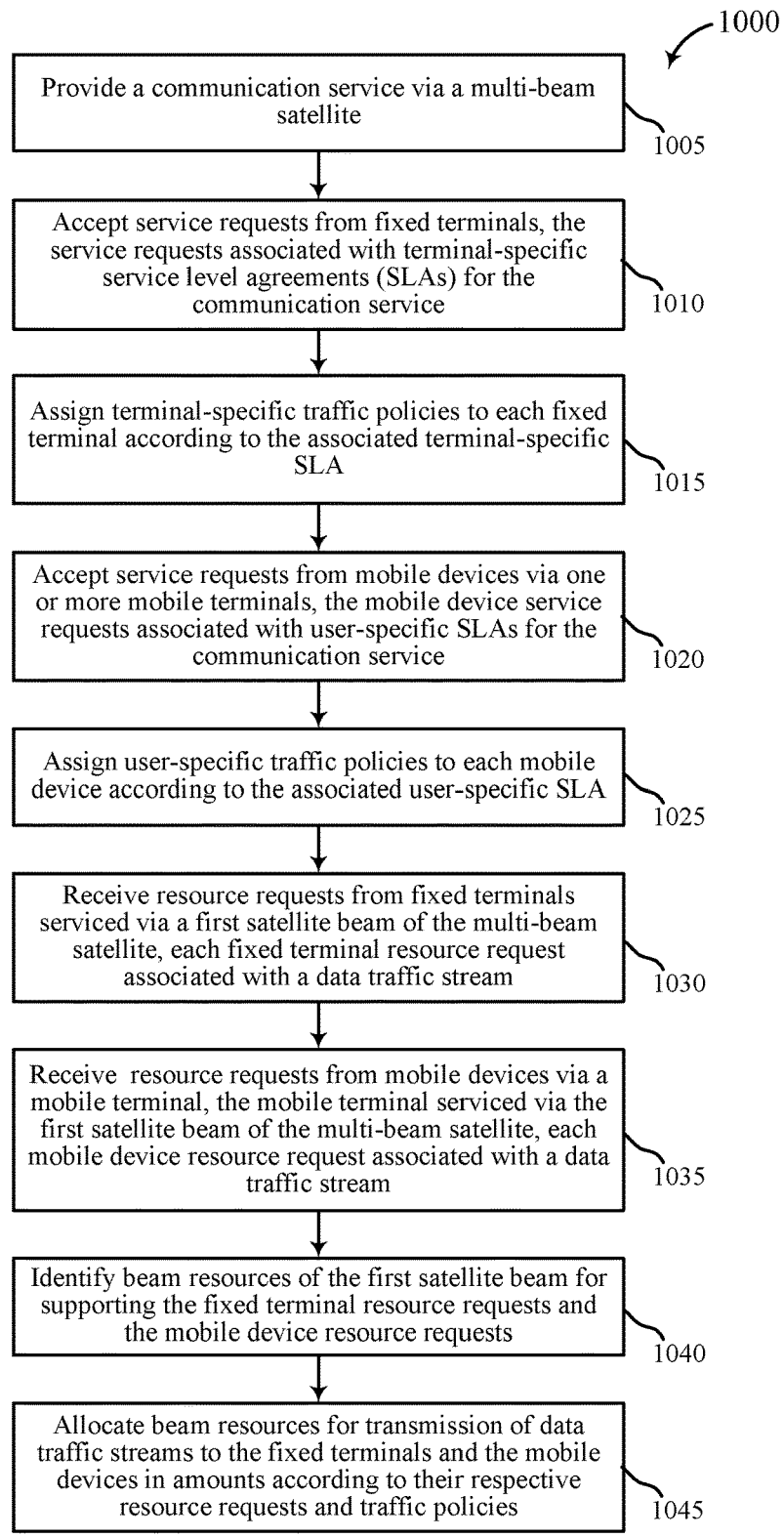
FIG. 10 illustrates a flowchart diagram of an example method of allocating resources in a satellite communications system providing per-user quality of service for mobile users and dynamic multiplexing of traffic from fixed terminals and mobile users on the same satellite beams in accordance with various embodiments

FIG. 10 illustrates a flowchart diagram of an example method 1000 of allocating resources in a satellite communications system providing per-user QoS for mobile devices and dynamic multiplexing of traffic from fixed terminals and mobile users on the same satellite beams in accordance with various embodiments. The method may be performed, for example, by the components associated with satellite service provider 410 of FIG. 4 and/or the network resource scheduler 900 of FIG. 9.

At block 1005 of method 1000, a communication service is provided via a multi-beam satellite. For example, a network access service may be provided via beams of a multi-beam satellite such as the multi-beam satellites 105 illustrated in FIGS. 1 and/or 4.

At block 1010, service requests may be received from fixed satellite terminals. The service requests may be associated with terminal-specific service level agreements (SLAs). The terminal-specific SLAs may define, for example, the level of service to be provided by the satellite network provider to the subscriber of the communication service. The level of service may be defined by, for example, rate-based, usage-based, and/or time based service parameters.

At block 1015, terminal-specific traffic policies may be assigned at a network resource scheduler to each fixed satellite terminal according to the associated terminal-specific SLA. The terminal-specific traffic policies may specify traffic flow management parameters (e.g., MinIR, CIR, PIR, etc.) for managing traffic flow to data streams (e.g., FL and/or RL) for each terminal.

At block 1020, service requests may be received from mobile devices via one or more mobile terminals. Each mobile terminal may be in communication with the multi-beam satellite and may be configured to provide the communication service concurrently to a plurality of mobile devices. The service requests may be associated with user-specific SLAs of mobile users. The mobile users may have an existing SLA with the satellite networking provider or may sign up for service according to an SLA upon connecting to one of the mobile terminals.

At block 1025, user-specific traffic policies may be assigned to each mobile device according to the associated user-specific SLA. The user-specific traffic policies may specify traffic flow management parameters (e.g., MinIR, CIR, PIR, etc.) for managing data streams (e.g., FL and/or RL) for each mobile user.

At block 1030, resource requests may be received from fixed satellite terminals serviced via a first satellite beam of the multi-beam satellite. Each fixed satellite terminal resource request may be associated with a data traffic stream. The fixed satellite resource requests may be associated with FL data traffic streams or RL data traffic streams.

At block 1035, resource requests may be received from mobile devices via a mobile terminal. The mobile terminal may also be serviced via the first satellite beam of the multi-beam satellite. Each mobile device resource request may be associated with a data traffic stream. The mobile device resource requests may be associated with FL data traffic streams or RL data traffic streams.

At block 1040, beam resources of the first satellite beam may be identified for supporting the fixed satellite resource requests and the mobile device resource requests. The identified beam resources may be a portion of or all beam resources of the first satellite beam. The identified beam resources may include, for example, frequency, polarization, and/or time resources for transmission of data over the first satellite beam.

At block 1045, the identified beam resources may be allocated to the fixed satellite terminals and to the mobile users. The identified beam resources may be allocated according to the amount of the resource requests from each of the fixed satellite terminals and mobile users, as well as the terminal-specific traffic policies associated with the fixed satellite terminals and the user-specific traffic policies associated with the mobile devices. For example, the amount of resources allocated to fixed and mobile terminals may vary with time and according to demand and traffic policies. Further, data traffic for each mobile user may be individually scheduled to control QoS for mobile users on a per-user basis.

Figure 11:
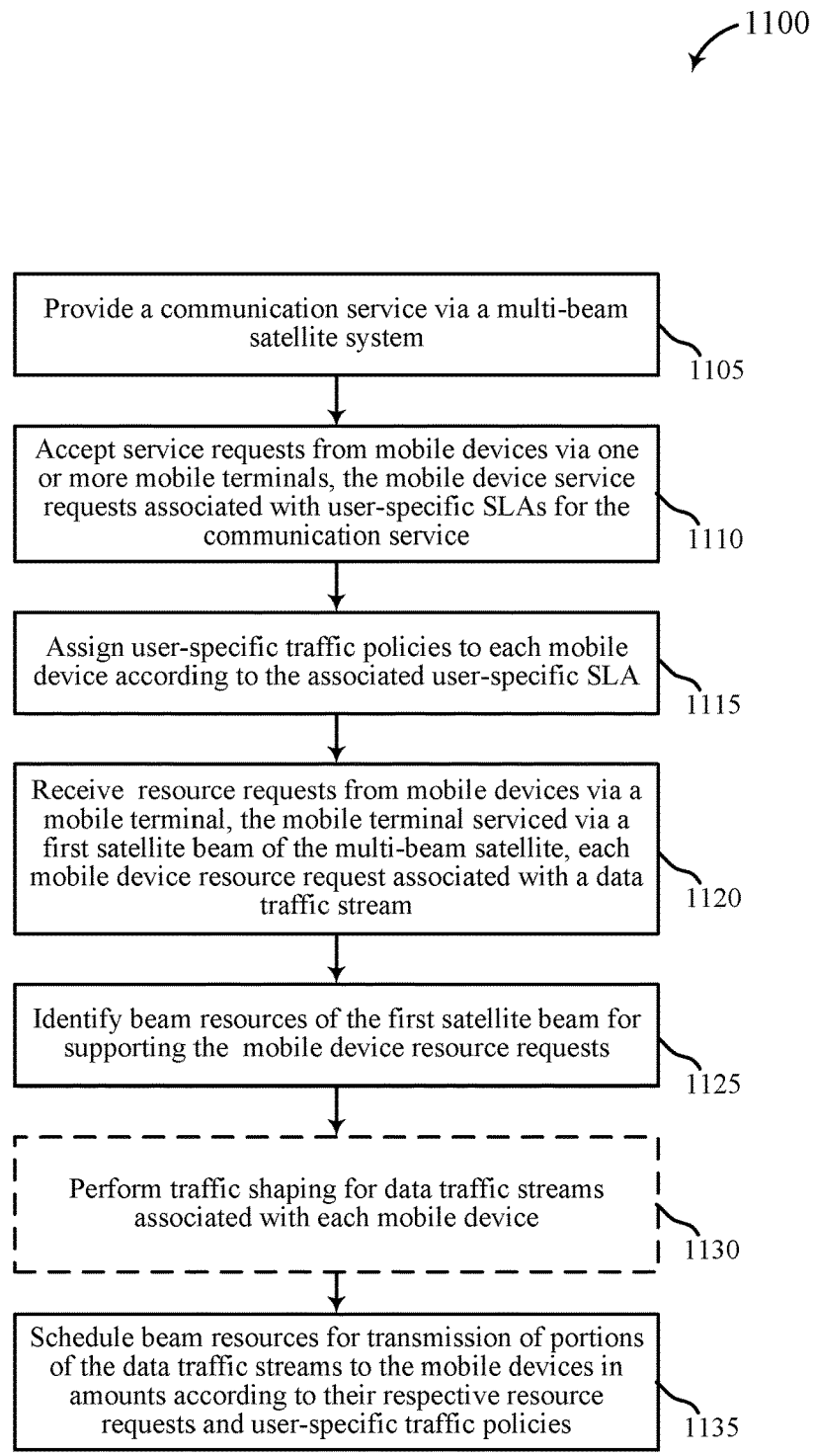
FIG. 11 illustrates a flowchart diagram of an example method of allocating resources in a satellite communications system providing per-user quality of service for mobile users in accordance with various embodiments.

FIG. 11 illustrates a flowchart diagram of an example method 1100 of allocating resources in a satellite communications system providing per-user QoS for mobile devices in accordance with various embodiments. The method may be performed, for example, by the components associated with satellite service provider 410 of FIG. 4 and/or the network resource scheduler 900 of FIG. 9.

At block 1105 of method 1100, a communication service is provided via a multi-beam satellite. For example, a network access service may be provided via beams of a multi-beam satellite such as the multi-beam satellites 105 illustrated in FIGS. 1 and/or 4.

At block 1110, service requests may be received from mobile devices via one or more mobile terminals. Each mobile terminal may be in communication with the multi-beam satellite and may be configured to provide the communication service concurrently to a plurality of mobile devices. The service requests may be associated with user-specific SLAs of mobile users associated with the mobile devices. The mobile users may have an existing SLA with the satellite networking provider or may sign up for service according to an SLA upon connecting to one of the mobile terminals.

At block 1115, user-specific traffic policies may be assigned to each mobile device according to the associated user-specific SLA. The user-specific traffic policies may specify traffic flow management parameters (e.g., MinIR, CIR, PIR, etc.) for managing data streams (e.g., FL and/or RL) for each mobile user.

At block 1120, resource requests may be received from mobile devices via a mobile terminal. The mobile terminal may be serviced via a first satellite beam of the multi-beam satellite. Each mobile device resource request may be associated with a data traffic stream. The mobile device resource requests may be associated with FL data traffic streams or RL data traffic streams.

At block 1125, beam resources of the first satellite beam may be identified for supporting the mobile device resource requests. The identified beam resources may be a portion of or all beam resources of the first satellite beam. The identified beam resources may include, for example, frequency, polarization, and/or time resources for transmission of data over the first satellite beam.

Optionally, at block 1130, traffic shaping may be performed for data traffic streams for each mobile device. For example, forward-link traffic shaping may be performed by identifying the data traffic streams destined for each mobile device (e.g., using public IP addresses assigned to the mobile devices, VLAN tags, tunneling protocol tags, etc.) and managing the traffic flow individually for each mobile device according to traffic policies associated with the mobile device. Return link traffic shaping may be performed at the mobile terminal by applying user-specific traffic policies individually to return link data traffic streams from mobile device(s) associated with each mobile user.

At block 1135, beam resources may be scheduled for transmission of portions of the data traffic streams to the mobile devices in amounts according to their respective resource requests and user-specific traffic policies as described above with reference to FIGS. 3A and 3B. Scheduling of beam resources for each data traffic stream associated with the mobile devices may also employ traffic prioritization. For example, some types of traffic (e.g., VoIP traffic, HTTP traffic, etc.) may be prioritized over other types of traffic for resource scheduling.

Figure 12:
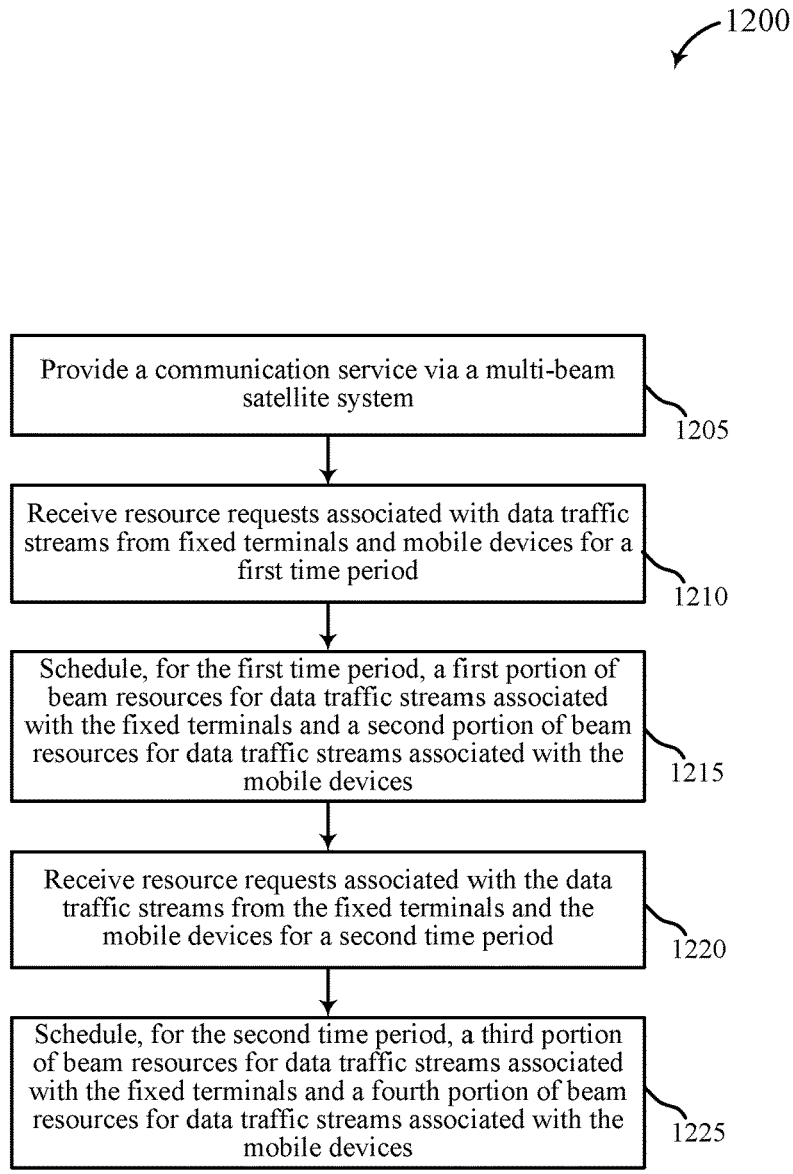
FIG. 12 illustrates a flowchart diagram of an example method for dynamic multiplexing of traffic from fixed terminals and mobile users on the same satellite beams in accordance with various embodiments.

FIG. 12 illustrates a flowchart diagram of an example method 1200 for dynamic multiplexing of traffic from fixed terminals and mobile users on the same satellite beams in accordance with various embodiments. The method may be performed, for example, by the components associated with satellite service provider 410 of FIG. 4 and/or the network resource scheduler 900 of FIG. 9.

At block 1205 of method 1200, a communication service is provided via a multi-beam satellite. For example, a network access service may be provided via beams of a multi-beam satellite such as the multi-beam satellites 105 illustrated in FIGS. 1 and/or 4.

At block 1210, a first set of resource requests may be received from fixed terminals and mobile devices for a first time period. The resource requests may be associated with data traffic streams (e.g., FL or RL) for the fixed terminals and mobile devices. The resource requests may specify requested resources for the first time period for transmission of the data traffic streams.

At block 1215, a first portion of beam resources of a first satellite beam may be scheduled for data traffic streams associated with the fixed terminals and a second portion of beam resources of the first satellite beam may be scheduled for data traffic streams associated with the mobile devices. The first and second portions of beam resources may be scheduled from a commonly provisioned resource pool of the first satellite beam.

At block 1220, a second set of resource requests may be received from fixed terminals and mobile devices for a second time period. The resource requests may be associated with data traffic streams (e.g., FL or RL) for the fixed terminals and mobile devices. The second set of resource requests may specify requested resources for the second time period for transmission of the data traffic streams.

At block 1225, a third portion of beam resources may be scheduled for data traffic streams associated with the fixed terminals and a fourth portion of beam resources may be scheduled for data traffic streams associated with the mobile devices. The third and fourth portions of beam resources may be scheduled from a commonly provisioned resource pool. The third portion of beam resources allocated to the fixed terminals for the second time period may be different than the first portion of beam resources allocated to the fixed terminals for the first time period. Similarly, the fourth portion of beam resources allocated to the mobile users for the second time period may be different than the second portion of beam resources allocated to the mobile users for the first time period. In embodiments, the portions of beam resources allocated to the fixed terminals and mobile terminals are determined based on traffic policies associated with the fixed terminals and mobile users, as well as the demand from the fixed terminals and mobile users in the resource requests.

Figure 13:
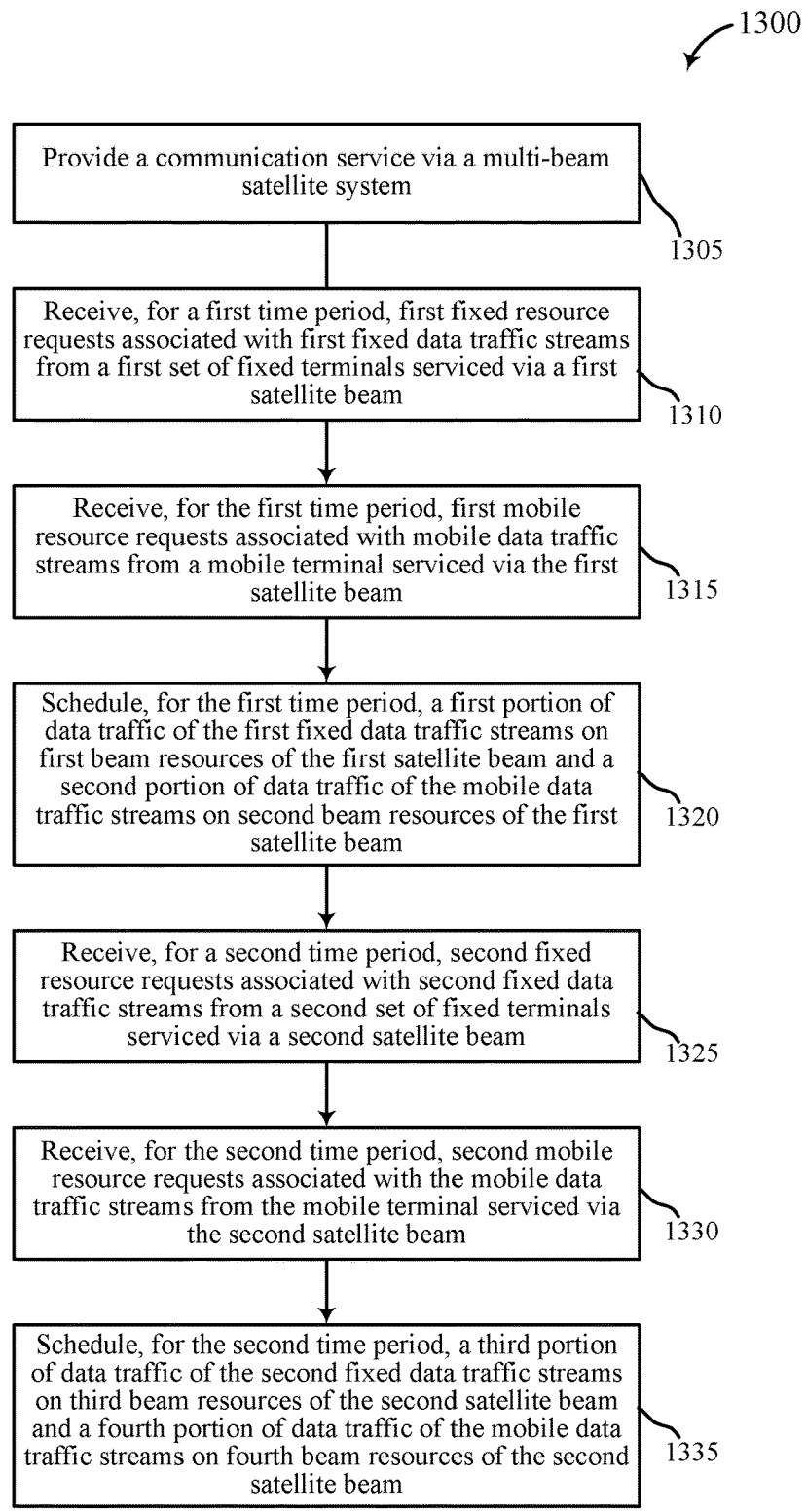
FIG. 13 illustrates a flowchart diagram of an example method for dynamic multiplexing of traffic from fixed terminals and mobile users on the same satellite beams in accordance with various embodiments.

FIG. 13 illustrates a flowchart diagram of an example method 1300 for dynamic multiplexing of traffic from fixed terminals and mobile users on the same satellite beams in accordance with various embodiments. The method may be performed, for example, by the components associated with satellite service provider 410 of FIG. 4 and/or the network resource scheduler 900 of FIG. 9.

At block 1305 of method 1300, a communication service is provided via a multi-beam satellite system. For example, a network access service may be provided via beams of one or more multi-beam satellites such as the multi-beam satellites 105 illustrated in FIGS. 1 and/or 4.

At block 1310, first fixed resource requests may be received for a first time period (e.g., frame, epoch, etc.). The first fixed resource requests may be associated with first fixed data traffic streams (e.g., FL or RL) from a first set of fixed terminals serviced via a first satellite beam. The resource requests may specify requested resources for the first time period for transmission of the first fixed data traffic streams.

At block 1315, first mobile resource requests may be received for the first time period. The first mobile resource requests may be associated with mobile data traffic streams from a mobile terminal serviced via the first satellite beam. The mobile terminal may provide network access via the multi-beam satellite system for multiple mobile devices. Each of the mobile devices may be associated with a mobile user, and mobile users may be assigned to user-specific traffic policies according to a user-specific SLA. The resource requests may specify requested resources for the first time period for transmission of the mobile data traffic streams.

At block 1320, scheduling may be performed for the first satellite beam for the first time period. For example, a first portion of data traffic of the first fixed data traffic streams may be scheduled on first beam resources of the first satellite beam for the first time period and a second portion of data traffic of the mobile data traffic streams may be scheduled on second beam resources of the first satellite beam for the first time period. The allocation of the first beam resources to the first fixed data traffic streams and of the second beam resources of the first satellite beam to the mobile data traffic streams may be performed according to terminal-specific traffic policies of the first set of fixed terminals and user-specific traffic policies of mobile users associated with the mobile devices as described above with reference to FIGS. 3A and 3B.

At block 1325, second fixed resource requests may be received for a second time period (e.g., frame, epoch, etc.). The second fixed resource requests may be associated with second fixed data traffic streams (e.g., FL or RL) from a second set of fixed terminals serviced via a second satellite beam. The resource requests may specify requested resources for the second time period for transmission of the second fixed data traffic streams.

At block 1330, second mobile resource requests may be received for the second time period for the mobile data traffic streams. The second mobile resource requests may be for resources of a second satellite beam. For example, the mobile terminal may have moved from the service region for the first satellite beam to the service region of the second satellite beam.

At block 1335, scheduling may be performed for the second satellite beam for the second time period. For example, a third portion of data traffic of the second fixed data traffic streams may be scheduled on third beam resources of the second satellite beam for the second time period and a fourth portion of data traffic of the mobile data traffic streams may be scheduled on fourth beam resources of the second satellite beam for the second time period. The allocation of the third beam resources to the second fixed data traffic streams and of the fourth beam resources of the second satellite beam to the mobile data traffic streams may be performed according to terminal-specific traffic policies of the second set of fixed terminals and user-specific traffic policies of mobile users associated with the mobile devices as described above with reference to FIGS. 3A and 3B.

Figure 14:
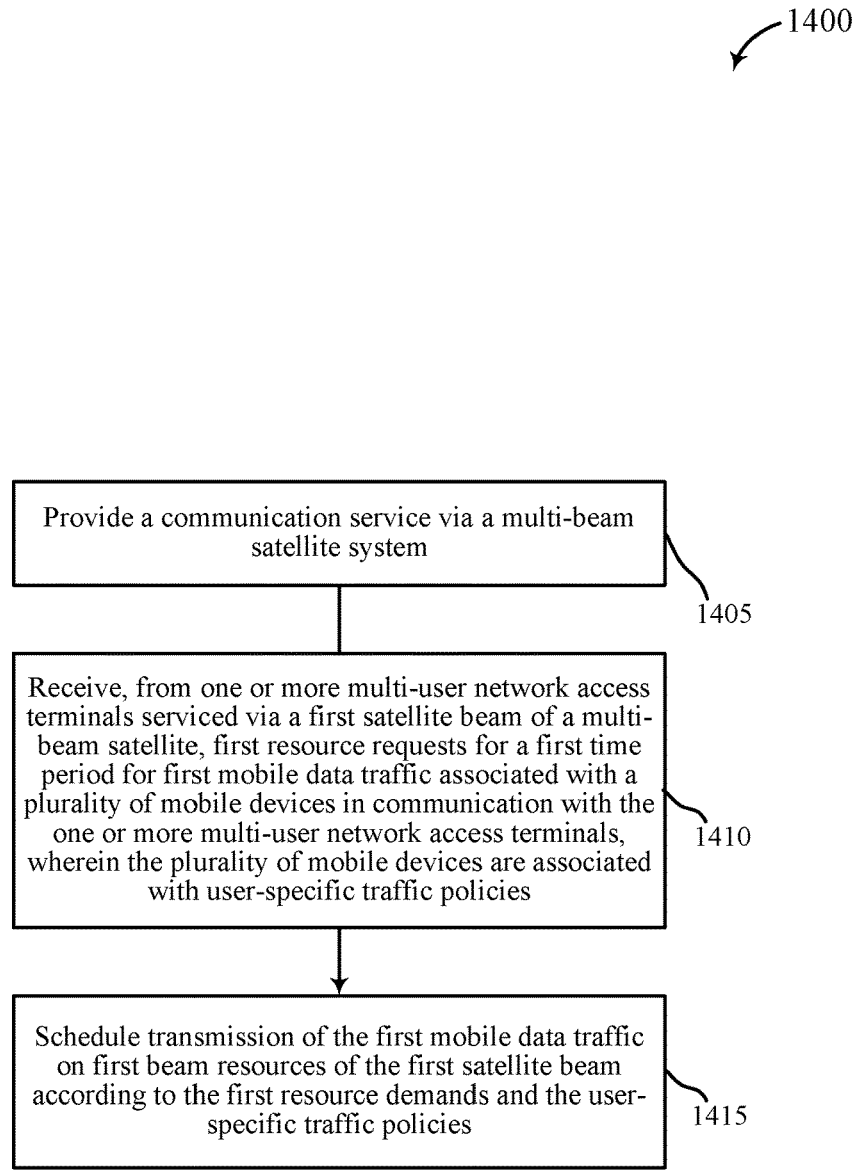
FIG. 14 illustrates a flowchart diagram of an example method of allocating resources in a satellite communications system providing per-user quality of service for mobile users in accordance with various embodiments.

FIG. 14 illustrates a flowchart diagram of an example method 1400 for dynamic multiplexing of traffic from fixed terminals and mobile users on the same satellite beams in accordance with various embodiments. The method may be performed, for example, by the components associated with satellite service provider 410 of FIG. 4 and/or the network resource scheduler 900 of FIG. 9.

At block 1405 of method 1400, a communication service is provided via a multi-beam satellite system. For example, a network access service may be provided via beams of one or more multi-beam satellites such as the multi-beam satellites 105 illustrated in FIGS. 1 and/or 4.

At block 1410, first resource demands for first mobile data traffic associated with a plurality of mobile devices may be received for a first time period. The plurality of mobile devices may be in communication with one or more multi-user network access terminals (e.g., mobile terminals, etc.) serviced via a first satellite beam of a multi-beam satellite. The plurality of mobile devices may be associated with user-specific traffic policies (e.g., according to a user-specific SLA). The first resource demands may indicate requested resources for the first time period for transmission of the first mobile data traffic. Each of the one or more multi-user network access terminals may provide network access for the communication service for a subset of mobile devices of the plurality of mobile devices.

At block 1415, scheduling may be performed for the first satellite beam for the first time period. For example, transmission of the first mobile data traffic on first beam resources of the first satellite beam may be scheduled according to the first resource demands and the user-specific traffic policies. For example, allocation of the first beam resources to the one or more multi-user network access terminals may be based on the first resource demands and the user-specific traffic policies associated with each of the plurality of mobile devices. Portions of the traffic streams to be transmitted on the first beam resources for the first time period may be determined based on the first resource demands and the user-specific traffic policies associated with each of the plurality of mobile devices. For FL traffic streams, transmission of the portions of the traffic streams to the one or more multi-user network access terminals may be performed according to the scheduled first beam resources. For RL traffic streams, the one or more multi-user network access terminals may transmit the portions of the traffic streams using the schedule first beam resources.

Figure 15:
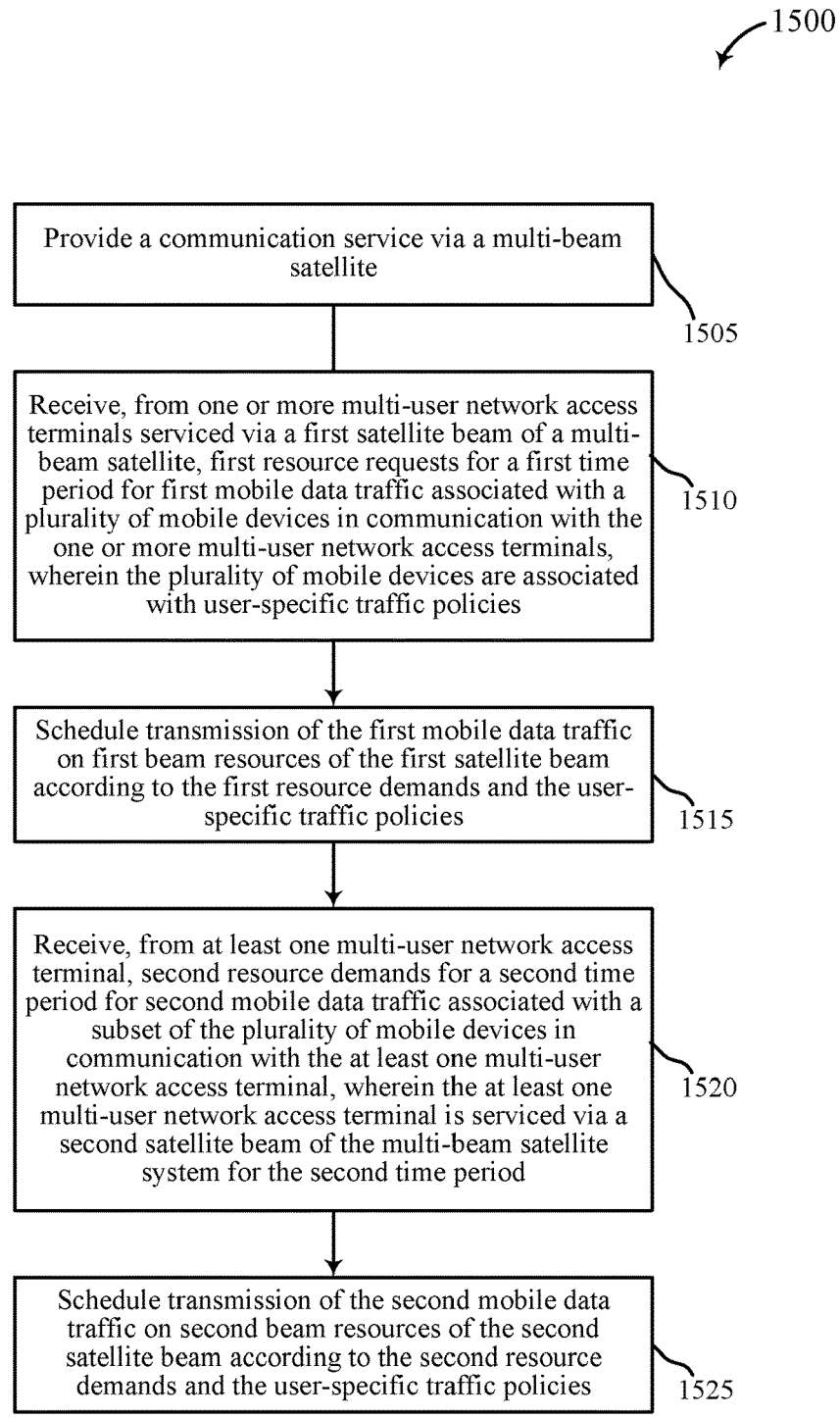
FIG. 15 illustrates a flowchart diagram of an example method of allocating resources in a satellite communications system providing per-user quality of service for mobile users in accordance with various embodiments.

FIG. 15 illustrates a flowchart diagram of an example method 1500 for dynamic multiplexing of traffic from fixed terminals and mobile users on the same satellite beams in accordance with various embodiments. The method may be performed, for example, by the components associated with satellite service provider 410 of FIG. 4 and/or the network resource scheduler 900 of FIG. 9.

At block 1505 of method 1500, a communication service is provided via a multi-beam satellite system. For example, a network access service may be provided via beams of one or more multi-beam satellites such as the multi-beam satellites 105 illustrated in FIGS. 1 and/or 4.

At block 1510, first resource demands for first mobile data traffic associated with a plurality of mobile devices may be received for a first time period. The plurality of mobile devices may be in communication with one or more multi-user network access terminals serviced via a first satellite beam of a multi-beam satellite. The plurality of mobile devices may be associated with user-specific traffic policies (e.g., according to a user-specific SLA). The first resource demands may indicate requested resources for the first time period for transmission of the first mobile data traffic. Each of the one or more multi-user network access terminals may provide network access for the communication service for a subset of mobile devices of the plurality of mobile devices.

At block 1515, scheduling may be performed for the first satellite beam for the first time period. For example, transmission of the first mobile data traffic on first beam resources of the first satellite beam may be scheduled according to the first resource demands and the user-specific traffic policies. For example, allocation of the first beam resources to the one or more multi-user network access terminals may be based on the first resource demands and the user-specific traffic policies associated with each of the plurality of mobile devices.

At block 1520, second resource demands for second mobile data traffic associated with a subset of the plurality of mobile devices may be received for a second time period. The second resource demands may be received from at least one multi-user network access terminal of the one or more multi-user network access terminals. The at least one multi-user network access terminal may be in communication with the subset of the plurality of mobile devices. The at least one multi-user network access terminal may be serviced via a second satellite beam of the multi-beam satellite system for the second time period. For example, the at least one multi-user network access terminal may have moved from being in the service region of the first satellite beam at the first time period to being in the service region of the second satellite beam at the second time period.

At block 1525, scheduling may be performed for the second satellite beam for the second time period. For example, the second mobile data traffic may be scheduled on second beam resources of the second satellite beam according to the second resource demands and the user-specific traffic policies as described above with reference to FIGS. 3A and 3B. Scheduling of the second mobile data traffic may account for resource demands of other fixed satellite terminals and users served by other multi-user network access terminals serviced by the second satellite beam.

Figure 16:
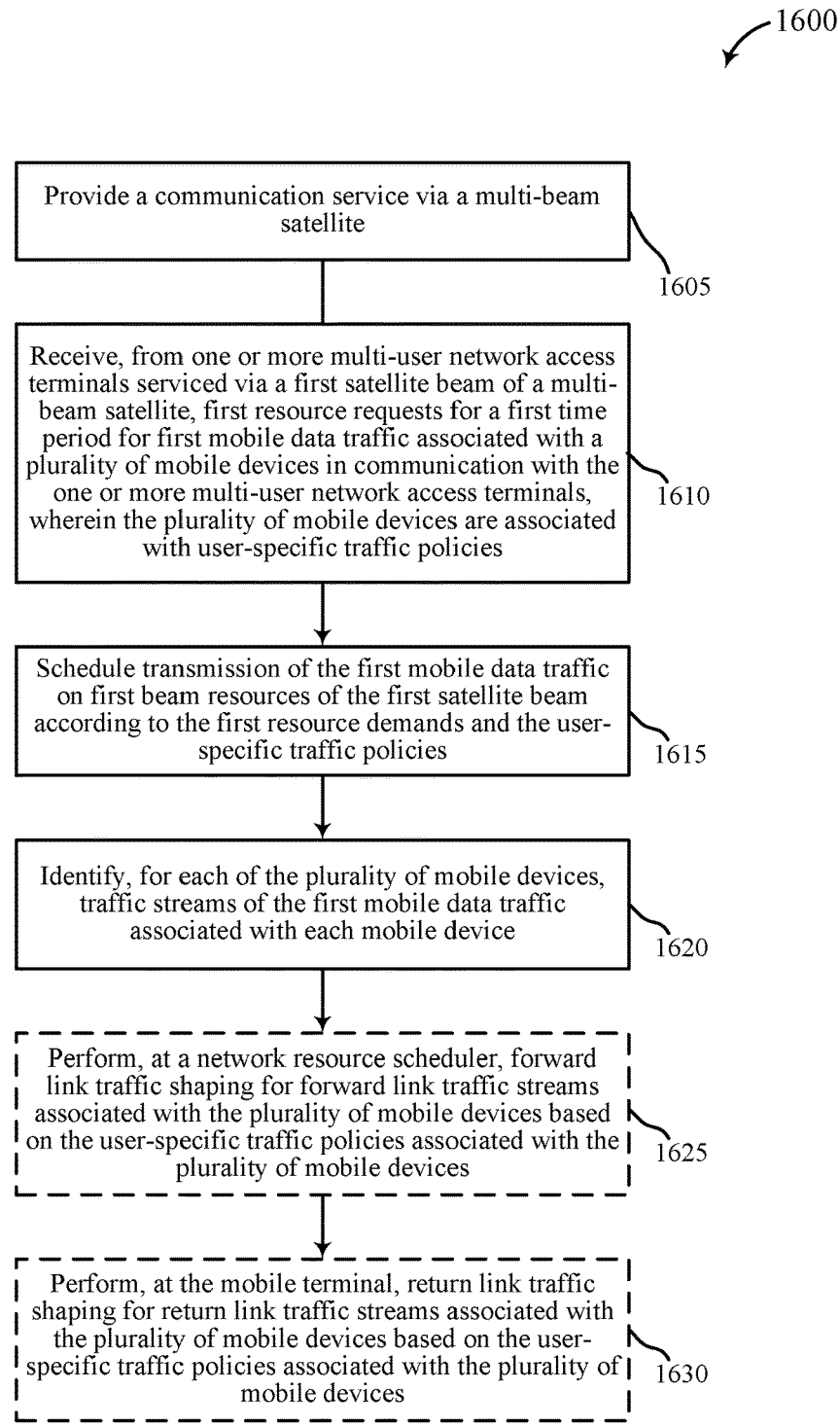
FIG. 16 illustrates a flowchart diagram of an example method of allocating resources in a satellite communications system providing per-user quality of service for mobile users in accordance with various embodiments.

FIG. 16 illustrates a flowchart diagram of an example method 1600 for dynamic multiplexing of traffic from fixed terminals and mobile users on the same satellite beams in accordance with various embodiments. The method may be performed, for example, by the components associated with satellite service provider 410 of FIG. 4 and/or the network resource scheduler 900 of FIG. 9.

At block 1605 of method 1600, a communication service is provided via a multi-beam satellite system. For example, a network access service may be provided via beams of one or more multi-beam satellites such as the multi-beam satellites 105 illustrated in FIGS. 1 and/or 4.

At block 1610, first resource demands for first mobile data traffic associated with a plurality of mobile devices may be received for a first time period. The plurality of mobile devices may be in communication with one or more multi-user network access terminals serviced via a first satellite beam of a multi-beam satellite. The plurality of mobile devices may be associated with user-specific traffic policies (e.g., according to a user-specific SLA). The first resource demands may indicate requested resources for the first time period for transmission of the first mobile data traffic. Each of the one or more multi-user network access terminals may provide network access for the communication service for a subset of mobile devices of the plurality of mobile devices.

At block 1615, scheduling may be performed for the first satellite beam for the first time period. For example, transmission of the first mobile data traffic on first beam resources of the first satellite beam may be scheduled according to the first resource demands and the user-specific traffic policies. For example, allocation of the first beam resources to the one or more multi-user network access terminals may be based on the first resource demands and the user-specific traffic policies associated with each of the plurality of mobile devices.

At block 1620, traffic streams of the first mobile data traffic associated with each mobile device may be identified for each of the plurality of mobile devices. The traffic streams may be identified using public IP addresses assigned to the mobile devices, VLAN tags, tunneling protocol tags, and the like.

Method 1600 may perform forward link traffic shaping and/or return link traffic shaping at blocks 1625 and 1630. For example, forward link traffic shaping as described above with reference to FIG. 5 or FIG. 7 may be performed at a network resource scheduler for forward link traffic streams associated with the plurality of mobile devices based on the user-specific traffic policies associated with the plurality of mobile devices at block 1625. Additionally or alternatively, return link traffic shaping as described above with reference to FIG. 6 or FIG. 8 may be performed at the mobile terminal for return link traffic streams associated with the plurality of mobile devices based on the user-specific traffic policies associated with the plurality of mobile devices at block 1630.

As will be readily understood, the components and modules described with reference to various embodiments above may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the principles described herein.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Furthermore, embodiments may be implemented by hardware, software, firmware, middleware, microcode, hardware description languages, or combinations thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the principles described herein. For example, the above elements may merely be a component of a larger system, wherein other rules may take precedence over or otherwise modify the application of the principles described herein. Also, a number of steps may be undertaken before, during, or after the above elements are considered. Accordingly, the above description should not be taken as limiting the scope of the invention.

What is claimed is:

1. A method, comprising:
   identifying forward link data streams associated with a plurality of mobile devices in communication with a multi-user network access terminal that is serviced via a forward link satellite beam of a multi-beam satellite communications system, wherein each of the plurality of mobile devices is associated with a user-specific traffic policy, and wherein an aggregate of a first provisioned level of the user-specific traffic policies for the plurality of mobile devices and the first provisioned level for other use-specific traffic policies for other devices serviced via the forward link satellite beam exceeds a physical capacity of the forward link satellite beam; and
   providing the first provisioned level of the user-specific traffic policies to the plurality of mobile devices, the providing comprising:
   allocating respective sets of beam resources to the plurality of mobile devices for a first time period, the allocated respective sets of beam resources determined based at least in part on respective amounts of demand associated with the forward link data streams for the first time period and the first provisioned levels of the user-specific traffic policies for the plurality of mobile devices in relation to an aggregate resource demand for the other devices for the first time period and an aggregate of the first provisioned levels for the other devices, wherein the allocating comprises:
   allocating a first set of beam resources to a first mobile device of the plurality of mobile devices for the first time period, wherein the first set of beam resources exceeds the first provisioned level of the user-specific traffic policy associated with the first mobile device; and
   allocating a second set of beam resources to a second mobile device of the plurality of mobile devices for the first time period, wherein the second set of beam resources is less than the first provisioned level of the user-specific traffic policy associated with the second mobile device; and
   scheduling, for the first time period, transmission of first data traffic of the forward link data streams to the multi-user network access terminal over the allocated respective sets of beam resources.

2. The method of claim 1, wherein the providing the first provisioned level of the user-specific traffic policies to the plurality of mobile devices comprises:
   allocating respective second sets of beam resources to the plurality of mobile devices for a second time period, the allocated respective second sets of beam resources determined based at least in part on respective amounts of demand associated with the forward link data streams for the second time period and the first provisioned levels of the user-specific traffic policies for the plurality of mobile devices in relation to an aggregate resource demand for the other devices for the second time period and an aggregate of the first provisioned levels for the other devices, wherein the allocating comprises:
   allocating a third set of beam resources to the first mobile device for the second time period, wherein the third set of beam resources is less than the first provisioned level of the user-specific traffic policy associated with the first mobile device; and
   allocating a fourth set of beam resources to the second mobile device for the second time period, wherein the fourth set of beam resources exceeds the first provisioned level of the user-specific traffic policy associated with the second mobile device; and
   scheduling, for the second time period, transmission of second data traffic of the forward link data streams to the multi-user network access terminal over the allocated respective second sets of beam resources.

3. The method of claim 1, wherein the first set of beam resources is less than a first resource demand of the first mobile device for the first time period and the second set of beam resources corresponds to a second resource demand of the second mobile device for the first time period.

4. The method of claim 3, wherein the first set of beam resources is less than or equal to a second provisioned level of the user-specific traffic policy associated with the first mobile device.

5. The method of claim 1, further comprising:
   identifying second forward link data streams associated with a second plurality of mobile devices in communication with a second multi-user network access terminal that is serviced via the forward link satellite beam of the multi-beam satellite communications system, wherein each of the second plurality of mobile devices is associated with a user-specific traffic policy having the first provisioned level; and
   providing the first provisioned level of the user-specific traffic policies to the second plurality of mobile devices, the providing comprising:
   allocating respective second sets of beam resources to the second plurality of mobile devices for the first time period, the allocated respective second sets of beam resources determined based at least in part on respective second amounts of demand associated with the second forward link data streams, the first provisioned levels of the user-specific traffic policies for the second plurality of mobile devices, the respective amounts of demand associated with the forward link data streams for the first time period, and the first provisioned levels of the user-specific traffic policies for the plurality of mobile devices; and
scheduling transmission of second data traffic of the second forward link data streams to the second multi-user network access terminal on the respective second sets of beam resources of the forward link satellite beam for the first time period, the respective second sets of beam resources being different from the respective sets of beam resources.

6. The method of claim 5, wherein a resource allocation for the first set of beam resources allocated to the multi-user network access terminal for the first time period is greater than a second resource allocation for the second set of beam resources allocated to the second multi-user network access terminal for the first time period.

7. The method of claim 1, further comprising:
performing forward link traffic shaping for the forward link data streams associated with the plurality of mobile devices based on at least one level of the user-specific traffic policies for the plurality of mobile devices.

8. The method of claim 7, wherein the forward link traffic shaping comprises delaying at least one packet of the forward link data streams from the first time period to a second time period subsequent to the first time period.

9. The method of claim 1, wherein
the first provisioned level of the user-specific traffic policy for the first mobile device is a first service level and the first provisioned level of the user-specific traffic policy for the second mobile device of the plurality of mobile devices is a second service level that is different from the first service level; and
the allocating the respective sets of beam resources comprises allocating the first and second sets of beam resources to the first and second mobile devices in proportion to the first and second service levels.

10. The method of claim 1, further comprising:
identifying return link data streams associated with the plurality of mobile devices for servicing via a return link satellite beam of the multi-beam satellite communications system, wherein the user-specific traffic policies for the plurality of mobile devices comprise second provisioned levels for the return link data streams; and
providing the second provisioned levels of the user-specific traffic policies to the plurality of mobile devices, the providing comprising:
allocating respective second sets of beam resources to the plurality of mobile devices for the first time period, the allocated second sets of beam resources determined based on respective second amounts of demand associated with the return link data streams and the second provisioned levels of the user-specific traffic policies for the plurality of mobile devices in relation to an aggregate return link resource demand for the other devices and an aggregate of the second provisioned levels for other devices serviced via the return link satellite beam for the first time period.

11. The method of claim 1, further comprising:
identifying each of the forward link data streams based on at least one of Internet Protocol (IP) addresses assigned to each of the plurality of mobile devices, virtual local area network (VLAN) tag addresses assigned to each of the plurality of mobile devices, socket port numbers assigned to each of the plurality of mobile devices, or tunneling protocol identifiers assigned to each of the plurality of mobile devices.

12. The method of claim 1, wherein the user-specific traffic policies comprise at least two of a minimum information rate (MinIR), a committed information rate (CIR), or a peak information rate (PIR).

13. The method of claim 1, wherein the respective sets of beam resources are allocated to the plurality of mobile devices by frequency-division multiplexing, time-division multiplexing, multiplexing using spreading codes, or a combination thereof.

14. The method of claim 1, wherein the other devices comprise a plurality of fixed terminals serviced via the forward link satellite beam for the first time period.

15. A satellite communication system for providing network access services, comprising:
a multi-user network access terminal that is serviced via a forward link satellite beam of a multi-beam satellite of the satellite communication system; and
a network resource scheduler in communication with the multi-beam satellite, the network resource scheduler comprising:
a mobile terminal network request processor to identify forward link data streams associated with a plurality of mobile devices in communication with the multi-user network access terminal, wherein each of the plurality of mobile devices is associated with a user-specific traffic policy, and wherein an aggregate of a first provisioned level of the user-specific traffic policies for the plurality of mobile devices and the first provisioned level for other use-specific traffic policies for other devices serviced via the forward link satellite beam exceeds a physical capacity of the forward link satellite beam; and
a satellite resource processor coupled with the mobile terminal network request processor, wherein, to provide the first provisioned level of the user-specific traffic policies to the plurality of mobile devices, the satellite resource processor to:
allocate respective sets of beam resources to the plurality of mobile devices for a first time period, the allocated respective sets of beam resources determined based at least in part on respective amounts of demand associated with the forward link data streams for the first time period and the first provisioned levels of the user-specific traffic policies for the plurality of mobile devices in relation to an aggregate resource demand for the other devices for the first time period and an aggregate of the first provisioned levels for the other devices, wherein the allocating comprises:
allocating a first set of beam resources to a first mobile device of the plurality of mobile devices for the first time period, wherein the first set of beam resources exceeds the first provisioned level of the user-specific traffic policy associated with the first mobile device; and
allocating a second set of beam resources to a second mobile device of the plurality of mobile devices for the first time period, wherein the second set of beam resources is less than the first provisioned level of the user-specific traffic policy associated with the second mobile device; and
schedule, for the first time period, transmission of first data traffic of the forward link data streams to the multi-user network access terminal over the allocated respective sets of beam resources.

16. The satellite communication system of claim 15, wherein, to provide the first provisioned level of the user-specific traffic policies to the plurality of mobile devices, the satellite resource processor to:
  allocate respective second sets of beam resources to the plurality of mobile devices for a second time period, the allocated respective second sets of beam resources determined based at least in part on respective amounts of demand associated with the forward link data streams for the second time period and the first provisioned levels of the user-specific traffic policies for the plurality of mobile devices in relation to an aggregate resource demand for the other devices for the second time period and an aggregate of the first provisioned levels for the other devices, wherein the allocating comprises:
    allocating a third set of beam resources to the first mobile device for the second time period, wherein the third set of beam resources is less than the first provisioned level of the user-specific traffic policy associated with the first mobile device; and
    allocating a fourth set of beam resources to the second mobile device for the second time period, wherein the fourth set of beam resources exceeds the first provisioned level of the user-specific traffic policy associated with the second mobile device; and
  schedule, for the second time period, transmission of second data traffic of the forward link data streams to the multi-user network access terminal over the allocated respective second sets of beam resources.

17. The satellite communication system of claim 15, wherein the first set of beam resources is less than a first resource demand of the first mobile device for the first time period and the second set of beam resources corresponds to a second resource demand of the second mobile device for the first time period.

18. The satellite communication system of claim 17, wherein the first set of beam resources is less than or equal to a second provisioned level of the user-specific traffic policy associated with the first mobile device.

19. The satellite communication system of claim 15, wherein:
  the mobile terminal network request processor further to identify second forward link data streams associated with a second plurality of mobile devices in communication with a second multi-user network access terminal that is serviced via the forward link satellite beam of the multi-beam satellite, wherein each of the second plurality of mobile devices is associated with a user-specific traffic policy having the first provisioned level; and
  the satellite resource processor, to provide the first provisioned level of the user-specific traffic policies to the second plurality of mobile devices, to:
    allocate respective second sets of beam resources to the second plurality of mobile devices for the first time period, the allocated respective second sets of beam resources determined based at least in part on respective second amounts of demand associated with the second forward link data streams, the first provisioned levels of the user-specific traffic policies for the second plurality of mobile devices, the respective amounts of demand associated with the forward link data streams for the first time period, and the first provisioned levels of the user-specific traffic policies for the plurality of mobile devices; and
    schedule transmission of second data traffic of the second forward link data streams to the second multi-user network access terminal on the respective second sets of beam resources of the forward link satellite beam for the first time period, the respective second sets of beam resources being different from the respective sets of beam resources.

20. The satellite communication system of claim 19, wherein a resource allocation for the first set of beam resources allocated to the multi-user network access terminal for the first time period is greater than a second resource allocation for the second set of beam resources allocated to the second multi-user network access terminal for the first time period.

21. The satellite communication system of claim 15, wherein the network resource scheduler comprises:
  a forward link traffic shaper to perform forward link traffic shaping for the forward link data streams associated with the plurality of mobile devices based on at least one level of the user-specific traffic policies for the plurality of mobile devices.

22. The satellite communication system of claim 21, wherein the forward link traffic shaping comprises delaying at least one packet of the forward link data streams from the first time period to a second time period subsequent to the first time period.

23. The satellite communication system of claim 15, wherein:
  the first provisioned level of the user-specific traffic policy for the first mobile device is a first service level and the first provisioned level of the user-specific traffic policy for the second mobile device of the plurality of mobile devices is a second service level that is different from the first service level; and
  the satellite resource processor to allocate the first and second sets of beam resources to the first and second mobile devices in proportion to the first and second service levels.

24. The satellite communication system of claim 15, wherein:
  the mobile terminal network request processor to identify return link data streams associated with the plurality of mobile devices for servicing via a return link satellite beam of the multi-beam satellite, wherein the user-specific traffic policies for the plurality of mobile devices comprise second provisioned levels for the return link data streams; and
  the satellite resource processor, to provide the second provisioned levels of the user-specific traffic policies to the plurality of mobile devices, to:
    allocate respective second sets of beam resources to the plurality of mobile devices for the first time period, the allocated second sets of beam resources determined based on respective second amounts of demand associated with the return link data streams and the second provisioned levels of the user-specific traffic policies for the plurality of mobile devices in relation to an aggregate return link resource demand for the other devices and an aggregate of the second provisioned levels for other devices serviced via the return link satellite beam for the first time period.

25. The satellite communication system of claim 15, the mobile terminal network request processor to identify each of the forward link data streams based on at least one of Internet Protocol (IP) addresses assigned to each of the plurality of mobile devices, virtual local area network (VLAN) tag addresses assigned to each of the plurality of mobile devices, socket port numbers assigned to each of the plurality of mobile devices, or tunneling protocol identifiers assigned to each of the plurality of mobile devices.

26. The satellite communication system of claim 15, wherein the user-specific traffic policies comprise at least two of a minimum information rate (MinIR), a committed information rate (CIR), or a peak information rate (PIR).

27. The satellite communication system of claim 15, wherein the respective sets of beam resources are allocated to the plurality of mobile devices by frequency-division multiplexing, time-division multiplexing, multiplexing using spreading codes, or a combination thereof.

28. The satellite communication system of claim 15, wherein the other devices comprise a plurality of fixed terminals serviced via the forward link satellite beam for the first time period.

29. A non-transitory computer readable medium storing code, the code comprising instructions executable by a processor for:
    identifying forward link data streams associated with a plurality of mobile devices in communication with a multi-user network access terminal that is serviced via a forward link satellite beam of a multi-beam satellite communications system, wherein each of the plurality of mobile devices is associated with a user-specific traffic policy, and wherein an aggregate of a first provisioned level of the user-specific traffic policies for the plurality of mobile devices and the first provisioned level for other use-specific traffic policies for other devices serviced via the forward link satellite beam exceeds a physical capacity of the forward link satellite beam; and
    providing the first provisioned level of the user-specific traffic policies to the plurality of mobile devices, the providing comprising:
        allocating respective sets of beam resources to the plurality of mobile devices for a first time period, the allocated respective sets of beam resources determined based at least in part on respective amounts of demand associated with the forward link data streams for the first time period and the first provisioned levels of the user-specific traffic policies for the plurality of mobile devices in relation to an aggregate resource demand for the other devices for the first time period and an aggregate of the first provisioned levels for the other devices, wherein the allocating comprises:
            allocating a first set of beam resources to a first mobile device of the plurality of mobile devices for the first time period, wherein the first set of beam resources exceeds the first provisioned level of the user-specific traffic policy associated with the first mobile device; and
            allocating a second set of beam resources to a second mobile device of the plurality of mobile devices for the first time period, wherein the second set of beam resources is less than the first provisioned level of the user-specific traffic policy associated with the second mobile device; and
        scheduling, for the first time period, transmission of first data traffic of the forward link data streams to the multi-user network access terminal over the allocated respective sets of beam resources.

* * * * *